United States Patent
Nakahira et al.

(10) Patent No.: US 12,107,524 B2
(45) Date of Patent: Oct. 1, 2024

(54) VEHICLE CONTROL APPARATUS

(71) Applicant: SUBARU CORPORATION, Tokyo (JP)

(72) Inventors: Shinichirou Nakahira, Tokyo (JP); Naoto Chiba, Tokyo (JP); Takuya Yano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 392 days.

(21) Appl. No.: 17/690,391

(22) Filed: Mar. 9, 2022

(65) Prior Publication Data
US 2022/0311368 A1    Sep. 29, 2022

(30) Foreign Application Priority Data
Mar. 25, 2021    (JP) ................................ 2021-051843

(51) Int. Cl.
*H02P 23/14*    (2006.01)
*B60L 15/20*    (2006.01)

(52) U.S. Cl.
CPC .............. *H02P 23/14* (2013.01); *B60L 15/20* (2013.01); *B60L 2240/421* (2013.01); *B60L 2240/423* (2013.01)

(58) Field of Classification Search
None
See application file for complete search history.

(56) References Cited

U.S. PATENT DOCUMENTS

| | | | | |
|---|---|---|---|---|
| 2006/0076914 | A1* | 4/2006 | Yaguchi | H02P 25/098 318/432 |
| 2010/0072925 | A1 | 3/2010 | Itoh et al. | |
| 2013/0110334 | A1* | 5/2013 | Asami | B60L 50/51 701/22 |
| 2014/0054986 | A1* | 2/2014 | Hirai | H02K 9/19 310/53 |

(Continued)

FOREIGN PATENT DOCUMENTS

| | | | | |
|---|---|---|---|---|
| CN | 104579036 A | * | 4/2015 | ............... H02P 6/08 |
| CN | 108282114 A | * | 7/2018 | ............... H02P 6/08 |

(Continued)

OTHER PUBLICATIONS

English translation of written description of Kong (CN 108282114 A) retrieved from Espacenet on May 22, 2024 (Year: 2024).*

*Primary Examiner* — Amelia Vorce
(74) *Attorney, Agent, or Firm* — Rimon P.C.

(57) ABSTRACT

A vehicle control apparatus includes a storage and a processor. The storage holds a first resonance map. The processor calculates a first torque command value and switches a control method of a first driving source. The first driving source includes an electric motor. The first torque command value indicates a value of torque to be outputted by the first driving source. The first resonance map includes, as one or more first resonance points, one or more operating points at which resonance occurs in an operating region of the first driving source under a square wave control. The processor switches the control method of the first driving source from the square wave control to a sine wave control on the condition that a predicted route of transition of an operating point of the first driving source meets the one or more first resonance points.

8 Claims, 15 Drawing Sheets

(56) References Cited

U.S. PATENT DOCUMENTS

| | | | |
|---|---|---|---|
| 2017/0207739 A1* | 7/2017 | Ang | H02P 6/17 |
| 2018/0244274 A1* | 8/2018 | Katayama | F02D 41/025 |
| 2020/0384867 A1* | 12/2020 | Yamada | H02P 23/04 |
| 2022/0219568 A1* | 7/2022 | Huang | H01M 10/615 |
| 2022/0294368 A1* | 9/2022 | Phillips | H02P 27/085 |

FOREIGN PATENT DOCUMENTS

| | | | | |
|---|---|---|---|---|
| JP | 2010-081658 A | | 4/2010 | |
| JP | 2022048448 A | * | 3/2022 | B60L 9/18 |

* cited by examiner

VEHICLE CONTROL APPARATUS

CROSS-REFERENCE TO RELATED APPLICATIONS

This application claims priority from Japanese Patent Application No. 2021-051843 filed on Mar. 25, 2021, the entire contents of which are hereby incorporated by reference.

BACKGROUND

The technology relates to a vehicle control apparatus.

Japanese Unexamined Patent Application Publication (JP-A) No. 2010-081658 discloses a system that controls a rotating electric machine mounted on a vehicle. The system is switched between a control mode in which the rotating electric machine is driven with a sine wave current and a control mode in which the rotating electric machine is driven with a square wave voltage. In the system, the control mode with the sine wave current is used in a low-speed range and the control mode with the square wave voltage is used in a high-speed range.

SUMMARY

An aspect of the technology provides a vehicle control apparatus to be mounted on a vehicle. The vehicle includes a first driving source and a first wheel to which torque is to be outputted from the first driving source. The first driving source includes an electric motor. The vehicle control apparatus includes a storage and a processor. The storage is configured to hold a first resonance map. The processor is configured to calculate a first torque command value and switch a control method of the first driving source. The first torque command value indicates a value of the torque to be outputted by the first driving source. The first resonance map includes, as one or more first resonance points, one or more operating points at which resonance occurs in an operating region of the first driving source under a square wave control. The processor is configured to switch the control method of the first driving source from the square wave control to a sine wave control on the condition that a predicted route of transition of an operating point of the first driving source meets the one or more first resonance points.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
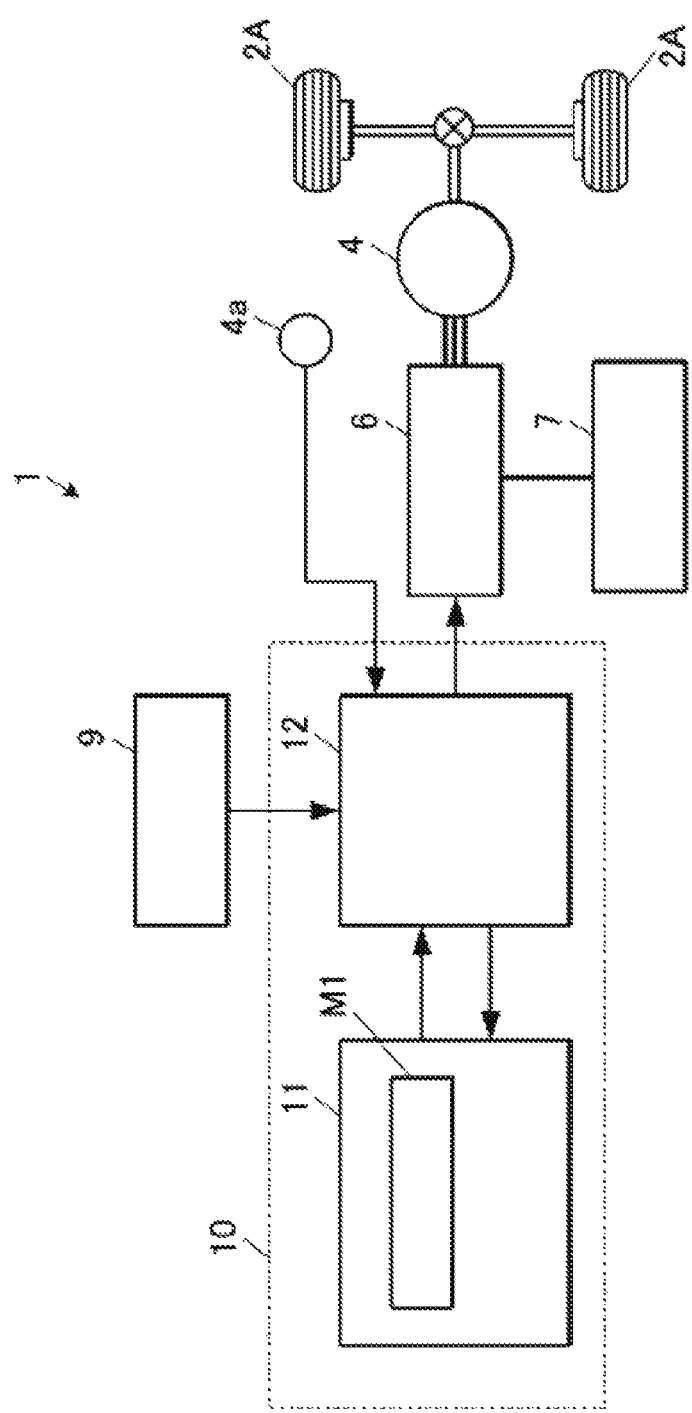
FIG. 1 is a block diagram of a vehicle on which a vehicle control apparatus according to a first embodiment of the disclosure is mounted.

In an existing system as disclosed in JP-A No. 2010-081658, a square wave voltage includes a higher harmonic component. Driving an electric motor of a vehicle with the square wave voltage causes electrical resonance in the electric motor and its vicinities. Such resonance may cause a noise sound in the vehicle.

It is desirable to provide a vehicle control apparatus that makes it possible to suppress generation of a noise sound caused by electrical resonance in driving an electric motor.

In the following, some example embodiments of the technology are described in detail with reference to the accompanying drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

First Embodiment

Figure 2:
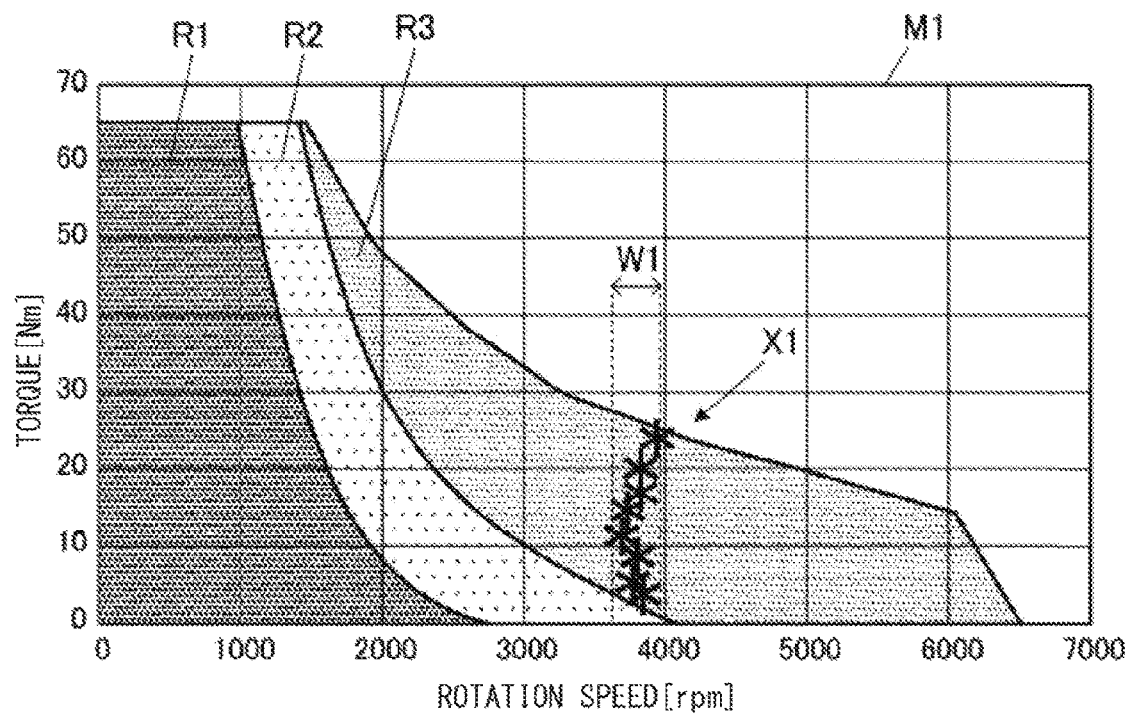
FIG. 2 is a graph that illustrates a first resonance map held in a storage.

FIG. 1 is a block diagram of a vehicle on which a vehicle control apparatus according to a first embodiment of the disclosure is mounted. FIG. 2 is a graph that illustrates a first resonance map held in a storage.

As illustrated in FIG. 1, a vehicle control apparatus 10 according to the first embodiment may be mounted on a vehicle 1. The vehicle 1 may include, without limitation, a first driving source 4. The first driving source 4 may include, without limitation, an electric motor. The first driving source 4 is configured to be sometimes brought to under a square wave control, and output torque to first wheels 2A. The vehicle control apparatus 10 includes, without limitation, a storage 11 and a processor 12. The storage 11 is configured to hold a first resonance map M1. The processor 12 is configured to calculate a first torque command value. The first torque command value indicates a value of the torque to be outputted by the first driving source 4. The vehicle 1 may further include, without limitation, a speed sensor 4a. The speed sensor 4a is configured to calculate directly or indirectly a rotation speed of the first driving source 4. A measured value of the speed sensor 4a may be sent to the processor 12. The vehicle 1 may further include, without limitation, a driving operation unit 9, a battery 7, and an inverter 6.

As illustrated in FIG. 2, the first resonance map M1 includes, as first resonance points X1, one or more operating points at which resonance occurs in the first driving source 4 or its vicinities in an operating region R3 of the first driving source 4 under the square wave control. Each of the one or more operating points may serve as the first resonance point X1. In FIG. 2, each of the first resonance points X1 is denoted by an asterisk "*". The first resonance map M1 may be created in advance on the basis of, for example, tests or simulation, and held in the storage 11.

Operating regions of the first driving source 4 may be represented by two-dimensional regions that have, as components, the rotation speed of the first driving source 4 and the torque of the first driving source 4. Any point in the relevant regions corresponds to one operating point of the first driving source 4.

The operating regions of the first driving source 4 may include, without limitation, an operating region R1, the operating region R3, and an operating region R2. In the operating region R1, a sine wave control is carried out. In the operating region R3, the square wave control is carried out. In the operating region R2, a transient control between the sine wave control and the square wave control is carried out.

The sine wave control means a control that includes allowing the inverter 6 to output a sine wave current to the first driving source 4, to bring the first driving source 4 to powering operation or regenerative operation. The sine wave current is PWM (Pulse Width Modulation) modulated by a switching control. The square wave control means a control that includes allowing the inverter 6 to output a square wave pulse voltage corresponding to a rotation phase of the first driving source 4, to bring the first driving source 4 to the powering operation. The square wave pulse voltage may be generated by ON and OFF switching of a power semiconductor switch element of the inverter 6 at the occasion of a rise and a fall of the voltage. The transient control means a control that includes making a control above a maximum amplitude of a PWM modulable sine wave current, to allow the inverter 6 to output a current of a distorted wave shape with respect to a sine wave, to bring the first driving source 4 to the powering operation.

A plurality of the first resonance points X1 included in the first resonance map M1 is included in the operating region R3 in which the square wave control is carried out. The first resonance points X1 typically gather in a specific rotation speed range W1 in the operating region R3. The first resonance points X1 may sometimes gather in the single specific rotation speed range W1, or alternatively, the first resonance points X1 may sometimes gather in a plurality of the specific rotation speed ranges W1.

Figure 3:
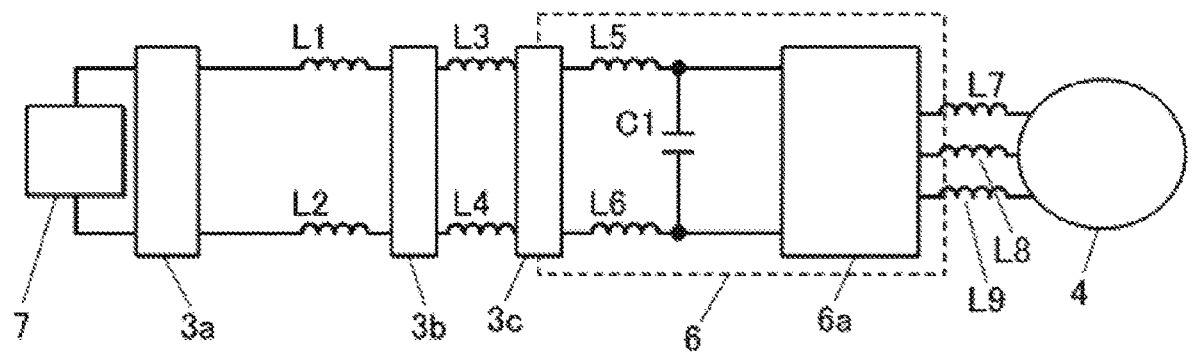
FIG. 3 is a diagram of a circuit configuration of a battery, an inverter, a first driving source, and their vicinities.

FIG. 3 illustrates a circuit configuration of the battery 7, the inverter 6, the first driving source 4, and their vicinities. As illustrated in FIG. 3, inductances L1 to L4, and L7 to L9 may be provided between the battery 7, the inverter 6, the first driving source 4, and their peripheral circuit. The peripheral circuit may include, without limitation, a relay 3a, and connectors 3b and 3c. The inverter 6 may include a switching circuit 6a. The inductances L5 and L6, and a capacitor C1 may be provided at a pre-stage of the switching circuit 6a. Accordingly, around the first driving source 4 and the inverter 6, the inductances L1 to L9 and the capacitor C1 may constitute a resonance circuit. This may sometimes cause electrical resonance at a specific frequency. The first resonance points X1 included in the first resonance map M1 are operating points where the electrical resonance as described above forms a physical vibration, causing generation of a noise sound. The square wave voltage includes a higher harmonic component, and easily has such electrical resonance. Thus, the first resonance points X1 are included in the operating region R3 under the square wave control.

The processor 12 may include, without limitation, an ECU (Electronic Control Unit). The ECU may include a CPU (Central Processing Unit), a RAM (Random Access memory), a ROM (Read Only Memory), and interfaces. The CPU may perform calculation processing. The CPU may expand data in the RAM. The ROM may hold a control program to be executed by the CPU. The interfaces may send and receive signals between the CPU and an external device of the processor 12. The processor 12 may include a single ECU, or alternatively, the processor 12 may include a plurality of ECUs that communicate with one another and operate in cooperation with one another.

The processor 12 may calculate a first torque command value on the basis of an operation of the driving operation unit 9 and predetermined limiting conditions. The operation of the driving operation unit 9 may include, for example, an amount of an accelerator operation and an amount of a brake operation. In one example, first, the processor 12 may calculate requested torque corresponding to the amount of the accelerator operation or the amount of the brake operation. The requested torque means torque requested by a driving operation. Furthermore, the processor 12 may calculate target torque on the basis of the requested torque in additional consideration of some limiting conditions. Non-limiting examples of the limiting conditions may include suppressing sudden torque fluctuation. Thus, the processor 12 may set the target torque as the first torque command value of the first driving source 4. In a case with a plurality of driving sources, the processor 12 may determine a ratio of assignment of the target torque to each driving source, and set the target torque assigned to the first driving source 4 as the first torque command value.

The first torque command value means a value of the torque to be outputted from the first driving source 4. The first torque command value may be sent to a control circuit of the inverter 6. The control circuit of the inverter 6 may make a feedback control to allow torque matching the first torque command value to be outputted from the first driving source 4, to control operation of the inverter 6. The operation of the inverter 6 allows for electric power transmission between the battery 7 and the first driving source 4. This brings the first driving source 4 to the powering operation or the regenerative operation, causing the torque of the first torque command value to be outputted.

Figure 4:
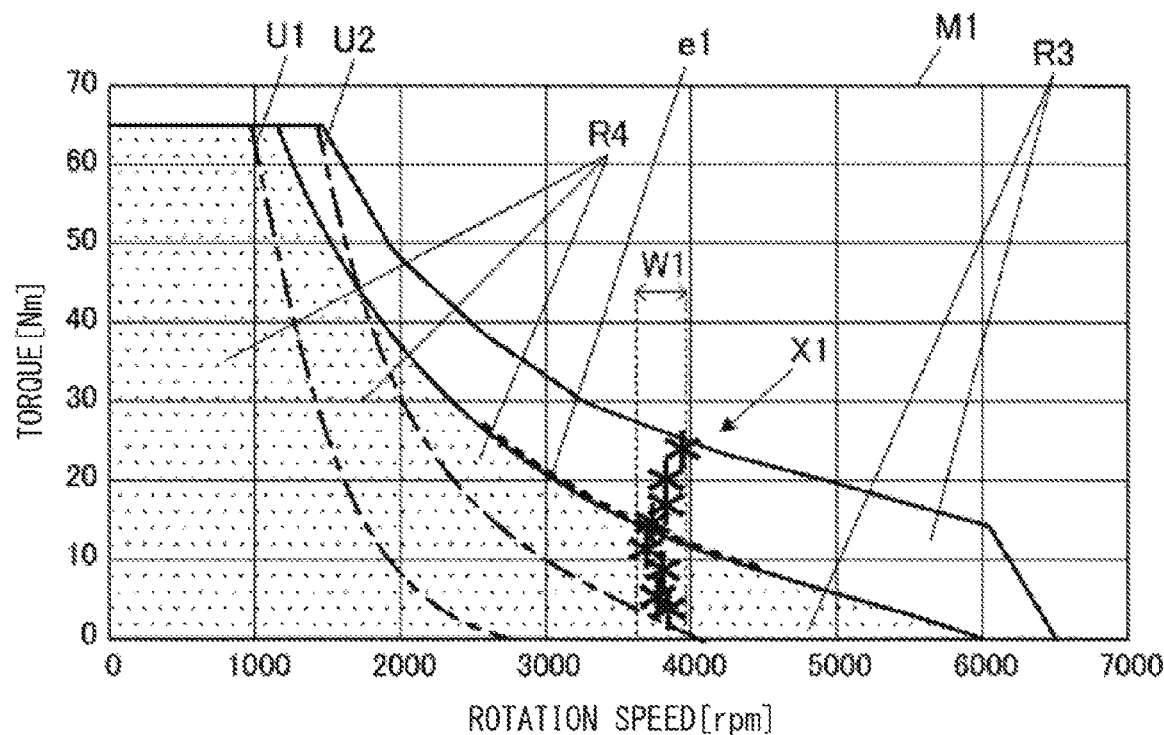
FIG. 4 illustrates operating regions of the first driving source.

FIG. 4 illustrates the operating regions of the first driving source. The operating regions R1, R3, and R2 (see FIG. 2) represent relation between a control method of the first driving source 4 and the operating regions of the first driving source 4 at normal time. As mentioned above, the sine wave control is carried out in the operating region R1. The square wave control is carried out in the operating region R3. The transient control is carried out in the operating region R2. In FIG. 4, a borderline U1 denotes a border between the operating regions R1 and R2. A borderline U2 denotes a border between the operating regions R2 and R3.

As illustrated in FIG. 4, the first driving source 4 is configured to be brought to under the sine wave control in an operating region R4. The operating region R4 is wider than the operating region R1. In FIG. 4, a polka-dotted region denotes the operating region R4 in which the sine wave control is available. The operating region R4 in which the sine wave control is available overlaps with the operating region R3 under the square wave control at the normal time.

Figure 5:
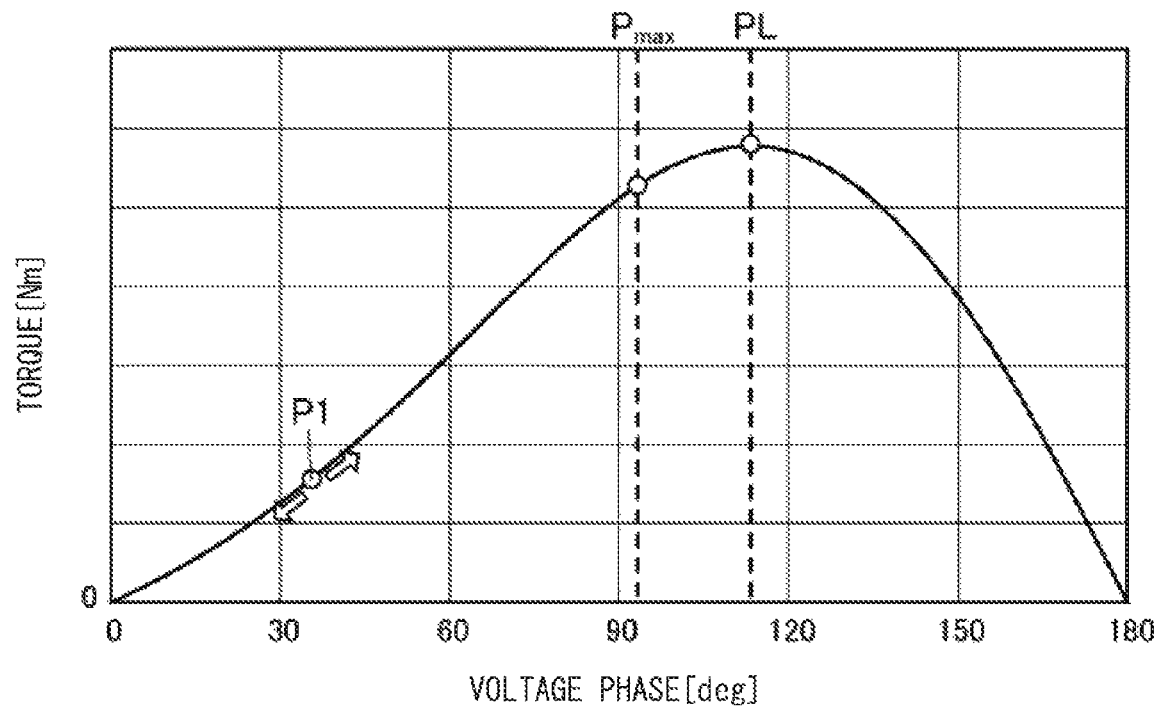
FIG. 5 is a graph that illustrates relation of torque and a voltage phase on the occasion of a sine wave control of the first driving source.

FIG. 5 is a graph that illustrates relation of a voltage phase and torque at the occasion of the sine wave control of the first driving source. The control circuit of the inverter 6 may make the feedback control to allow an estimated value of the torque to be outputted from the first driving source 4 to match the first torque command value, to control a voltage phase P1 of an output voltage of the inverter 6. The voltage phase P1 means a difference between a rotation phase angle of the first driving source 4 and a phase angle of the output voltage of the inverter 6. In one example, in a case where the first driving source 4 includes a three-phase motor, the voltage phase P1 means a difference between a phase angle of an induced voltage generated in motor coils of respective phases and the phase angle of the voltage to be outputted from the inverter 6. At the occasion of the sine wave control, the control circuit of the inverter 6 may control an amplitude of the sine wave current and the voltage phase P1, to change the torque of the first driving source 4.

As illustrated in FIG. 5, in a case where the amplitude of the sine wave current is assumed to be constant, as the voltage phase P1 goes from a smaller value toward a prescribed phase Pmax, the torque of the first driving source 4 becomes greater. Furthermore, as the voltage phase P1 goes toward a limit phase PL that advances from the prescribed phase Pmax, the torque of the first driving source 4 becomes greater. As the voltage phase P1 passes the limit phase PL, the torque of the first driving source 4 becomes smaller.

Under the sine wave control at the normal time, the control circuit of the inverter 6 may control the voltage phase P1 in a range of the prescribed phase Pmax or smaller. Extending the control range of the voltage phase P1 to the limit phase PL makes it possible to carry out the sine wave control in the wider operating region R4, as illustrated in FIG. 4.

The operating region R4 in which the sine wave control is available corresponds to a region in which the voltage phase P1 under the sine wave control is equal to or smaller than the limit phase PL. An upper borderline e1 of the operating region R4 denoted by a broken line in FIG. 4 corresponds to operating points at which the voltage phase P1 under the sine wave control reaches the limit phase PL. In other words, in a case where the operating point of the first driving source 4 is located on the borderline e1 of the operating region R4, a value of the torque at the relevant operating point corresponds to upper limit torque available for being outputted under the sine wave control at the rotation speed of the relevant operating point.

Thus, in a case where the operating point of the first driving source 4 is located in the operating region R3 under the square wave control, but located on lower side of the borderline e1, it is possible to switch the control method of the first driving source 4 from the square wave control to the sine wave control while maintaining the torque of the first driving source 4. In contrast, in a case where the operating point of the first driving source 4 is located in the operating region R3 under the square wave control and on upper side of the borderline e1, it is not possible to switch the control method of the first driving source 4 from the square wave control to the sine wave control while maintaining the torque of the first driving source 4. In this case, lowering the torque of the first driving source 4 to shift the operating point to the lower side of the borderline e1 makes it possible to switch the control method of the first driving source 4 from the square wave control to the sine wave control. The upper side of the borderline e1 refers to side of the borderline e1 on which the torque is greater. The lower side of the borderline e1 refers to side of the borderline e1 on which the torque is smaller.

At the normal time, the control circuit of the inverter 6 may switch, as appropriate, the control method of the first driving source 4 between the sine wave control, the square wave control, and the transient control, in accordance with the first torque command value and the rotation speed of the first driving source 4. In this embodiment, in a case where the operating point of the first driving source 4 is located in an overlap between the operating regions R3 and R4, the processor 12 is configured to make a control to switch the control method of the first driving source 4 between the sine wave control and the square wave control. In one example, the processor 12 may output a signal that designates the control method to the control circuit of the inverter 6, to allow the control circuit of the inverter 6 to make the switching as mentioned above.

While the first driving source 4 is in operation, the processor 12 may check whether a predicted locus of the operating point of the first driving source 4 meets the first resonance points X1. The predicted locus of the operating point means a locus of an operating point on an assumption that a rate of change in the torque is kept constant, or the torque is kept constant. The rate of change in the torque means an amount of change per unit time. In calculating the locus of the operating point, the processor 12 may calculate an amount of change in the rotation speed of the first driving source 4 on the basis of the torque and an incline of a road surface. Alternatively, the processor 12 may calculate the amount of change in the rotation speed of the first driving source 4 with the use of a rate of change in the rotation speed with respect to immediately preceding torque, instead of the incline of the road surface. Each operating point on the predicted locus corresponds to a predicted route of transition of the operating point of the first driving source 4.

Furthermore, in a case where the predicted locus of the operating point of the first driving source 4 meets the first resonance points X1, the processor 12 is configured to switch the control method of the first driving source 4 from the square wave control to the sine wave control. Switching the control method of the first driving source 4 to the sine wave control before the operating point of the first driving source 4 meets the first resonance points X1 makes it possible to suppress the generation of the noise sound caused by the electrical resonance.

On the occasion of the switching to the sine wave control, in a case where the torque of the first driving source 4 is greater than the upper limit torque under the sine wave control, the processor 12 may decrease the first torque command value. The upper limit torque under the sine wave control means the upper limit torque at the rotation speed at the relevant time. In one example, the processor 12 may decrease the first torque command value to a smaller value than the target torque, to lower the torque of the first driving source 4 to the upper limit torque or smaller. It is to be noted that on the occasion of the switching to the sine wave control, the processor 12 may determine whether or not the voltage phase of the output voltage of the inverter 6 exceeds the limit phase PL, to determine whether or not the torque of the first driving source 4 is greater than the upper limit torque.

After the switching to the sine wave control, in a case where the processor 12 determines that the operating point of the first driving source 4 has passed the first resonance points X1, the processor 12 may end designation of the control method of the first driving source 4. Thereafter, the control method in accordance with the location of the operating point may be applied.

In the case where the processor 12 decreases the first torque command value to the smaller value than the target torque on the occasion of the switching to the sine wave control, the processor 12 may restore the first torque command value to the target torque, in parallel to the end of the designation of the control method as mentioned above.

Operation Example

Figure 6:
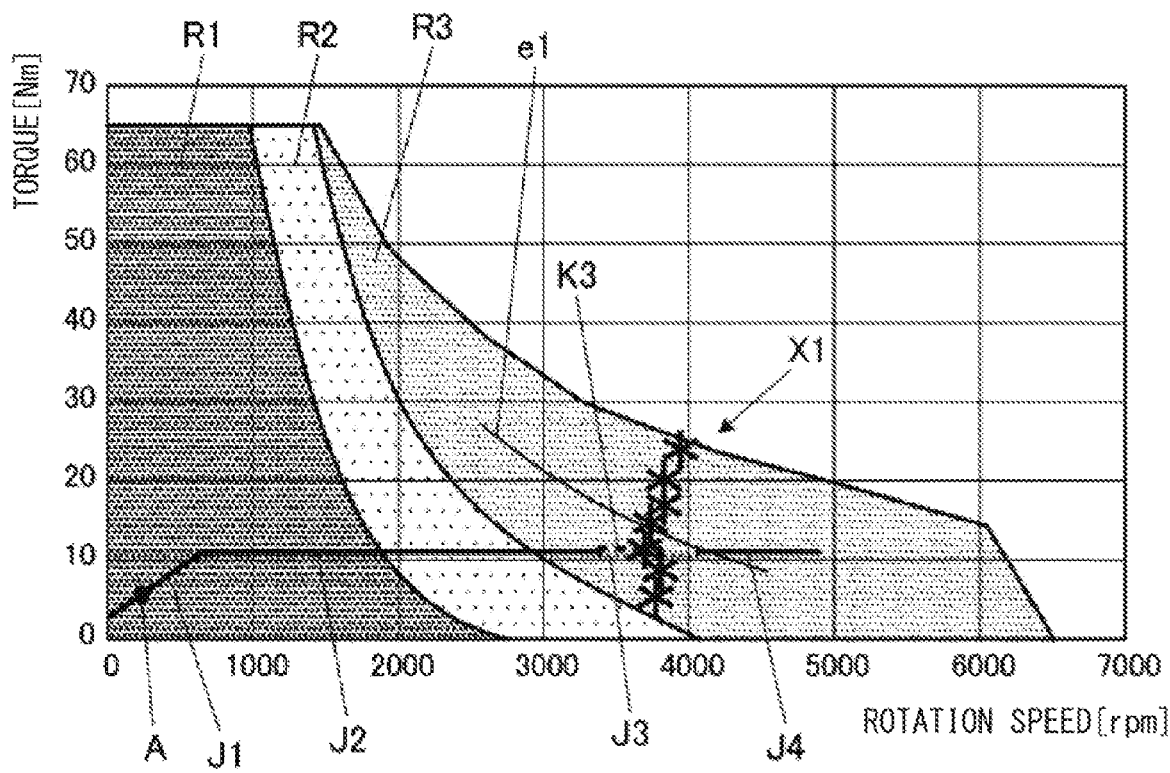
FIG. 6 illustrates a first example of workings of the vehicle control apparatus according to the first embodiment.

FIG. 6 illustrates a first example of workings of the vehicle control apparatus according to the first embodiment. Loci J1 to J4 in FIG. 6 denote transitions of an operating point A of the first driving source 4 in one travel example of the vehicle 1. In the travel example in FIG. 6, an output of the torque by the first driving source 4 causes a gradual increase in the rotation speed of the first driving source 4. In other words, the vehicle 1 is accelerated. Thus, the operating point A of the first driving source 4 makes the sequential transitions along the loci J1 to J4.

On the locus J1, a driver increases the amount of the accelerator operation, causing an increase in the torque from the first driving source 4. On the locus J2, the driver maintains the amount of the accelerator operation, keeping the torque from the first driving source 4 substantially constant. In a case where the operating point A is located in the operating region R3 under the square wave control, the processor 12 may determine whether or not the predicted route of the transition of the operating point A, i.e., the operating point A on the predicted locus K3, meets the first resonance points X1. In FIG. 6, the predicted locus K3 is denoted by a bold broken line.

In the travel example in FIG. 6, the driver maintains the amount of the accelerator operation while the operating point A makes the transitions along the loci J2 and J3. Accordingly, the predicted locus K3 is a locus of the operating point A on which the rotation speed of the first driving source 4 increases while the torque is constant, and the predicted locus K3 meets the first resonance points X1. In a case where the processor 12 determines that the predicted locus K3 meets the first resonance points X1, the processor is configured to output a signal to switch the control method of the first driving source 4 from the square wave control to the sine wave control, to the control circuit of the inverter 6. In FIG. 6, the locus J3 of the operating point A on the occasion of the switching to the sine wave control is denoted by a thin broken line.

The processor 12 may further determine, on the basis of the torque and the rotation speed of the first driving source denoted by the operating point A at the relevant time, whether or not the torque at the relevant time is equal to or smaller than the upper limit torque under the sine wave control, i.e., the upper limit torque at the relevant rotation speed. The travel example in FIG. 6 illustrates a case where the locus J3 is located on the lower side of the borderline e1 that indicates the limit phase PL, and the determination as mentioned above results in affirmation (YES). In the case where the determination results in affirmation (YES), the processor 12 may output the target torque as it is as the first torque command value.

In the travel example in FIG. 6, the locus J3 of the operating point A under the sine wave control meets the first resonance points X1, but the first driving source 4 is not under the square wave control. This leads to suppression of the electrical resonance around the first driving source 4 and the inverter 6. Accordingly, the generation of the noise sound caused by the electrical resonance is also suppressed.

Thereafter, the operating point A makes the transitions along the locus J3, and passes the first resonance points X1. Thereupon, the processor 12 may determine that the predicted locus of the operating point A does not meet the first resonance points X1, and end the designation of the control method of the first driving source 4. Thereafter, on the locus J4, the end of the designation of the control method of the first driving source 4 causes the control method of the first driving source 4 to be restored to the square wave control.

Figure 7:
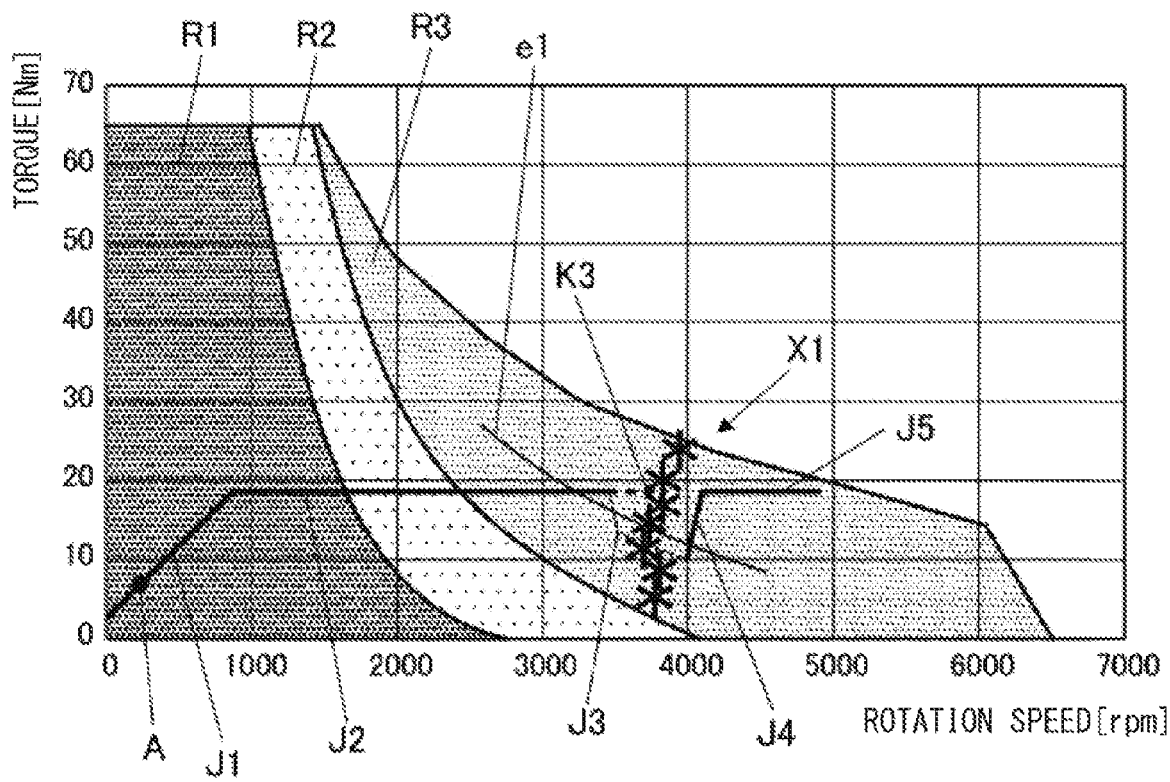
FIG. 7 illustrates a second example of the workings of the vehicle control apparatus according to the first embodiment.

FIG. 7 illustrates a second example of the workings of the vehicle control apparatus according to the first embodiment. Loci J1 to J5 in FIG. 7 denote the transitions of the operating point A of the first driving source 4 in another travel example of the vehicle 1. In the travel example in FIG. 7, the output of the torque by the first driving source 4 causes a gradual increase in the rotation speed of the first driving source 4. In other words, the vehicle 1 is accelerated. Thus, the operating point A of the first driving source 4 makes the sequential transitions along the loci J1 to J5.

The same description as given with reference to FIG. 6 is the case with the loci J1 and J2. In a case with the operating point A located at a rear end of the locus J2, the processor 12 may determine that the predicted locus K3 meets the first resonance points X1. FIG. 7 illustrates a case where the torque at the operating point A on the occasion of the forgoing determination is greater than the upper limit torque under the sine wave control, i.e., the upper limit torque at the rotation speed at the relevant time. In other words, FIG. 7 illustrates a case where the torque at the operating point A on the occasion of the forgoing determination is located on the upper side of the borderline e1. In this case, the processor 12 may switch the control method of the first driving source 4 to the sine wave control, and decrease the first torque command value to the smaller value than the target torque, allowing the first torque command value to become smaller than the upper limit torque. The locus J3 of the operating point A on the occasion of the switching to the sine wave control is denoted by a thin broken line. The locus J3 is located on the lower side of the borderline e1 that indicates that the voltage phase under the sine wave control is at the limit phase PL.

On the locus J3, the operating point A of the first driving source 4 meets the first resonance points X1. However, switching the control method of the first driving source 4 to the sine wave control leads to the suppression of the generation of the electrical resonance around the first driving source 4 and the inverter 6. Accordingly, the generation of the noise sound caused by the electrical resonance is also suppressed.

Thereafter, the operating point A passes the first resonance points X1. Thereupon, the processor 12 may determine that the operating point A has passed the first resonance points X1, and end the designation of the control method of the first driving source 4. Furthermore, the processor 12 may restore the first torque command value to the target torque. The locus J4 indicates the locus of the operating point A on the occasion that the control method of the first driving source 4 is restored to the square wave control and the first torque command value is restored to the target torque. On the locus J4, the amount of change in the torque per unit time may be limited to a prescribed value or smaller, to restore the first torque command value gradually to the target torque. The locus J5 indicates the locus of the operating point A after the first torque command value is restored to the target torque.

<Control Processing>

Figure 8:
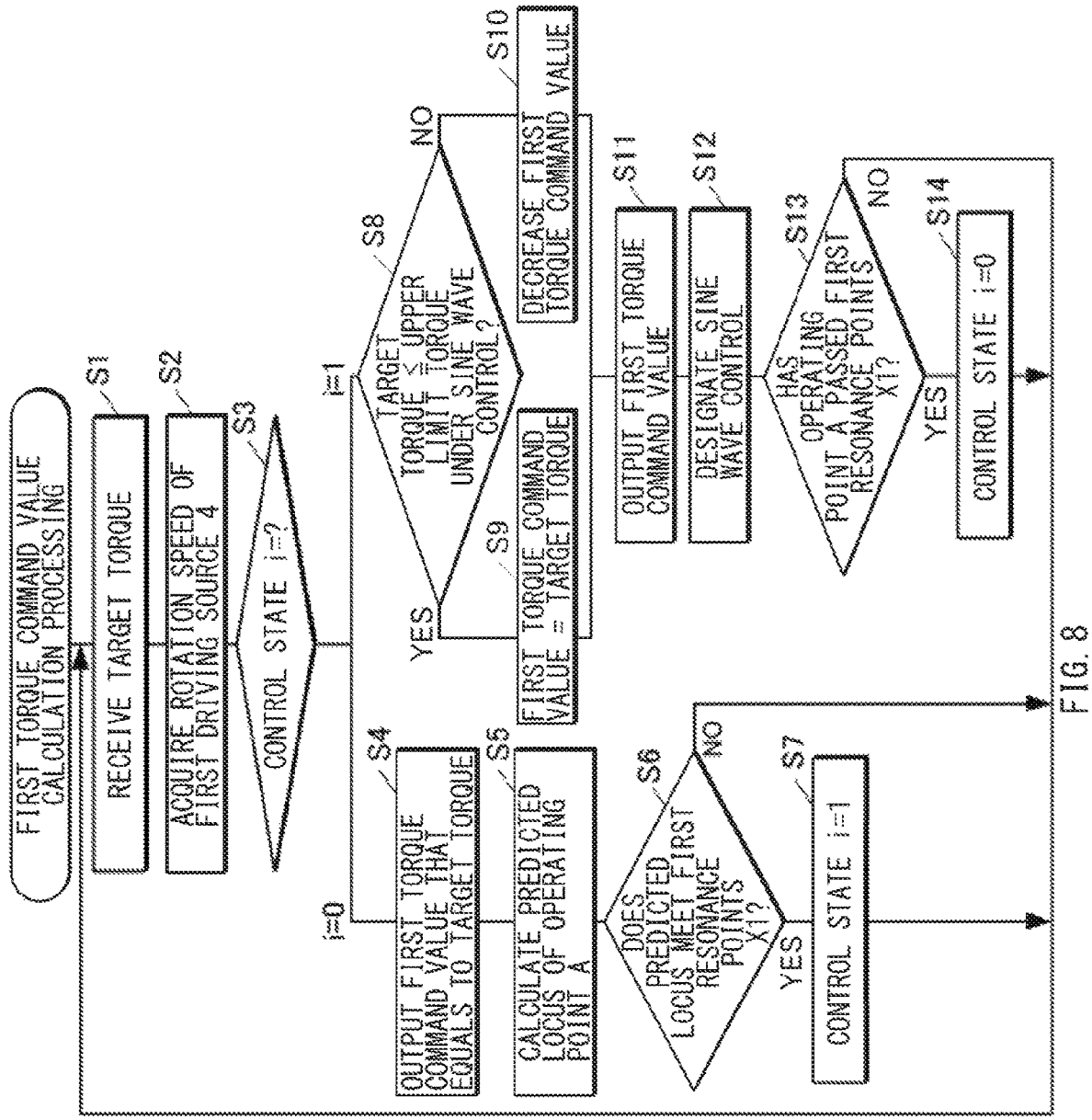
FIG. 8 is a flowchart of torque command value calculation processing to be carried out by a processor.

Description is given next of an example of control processing of the processor, to realize the control operation described above. FIG. 8 is a flowchart of torque command value calculation processing to be carried out by the processor. The processor may constantly and repeatedly carry out the torque command value calculation processing in FIG. 8 in a state where the vehicle 1 is ready to travel.

In the torque command value calculation processing, the processor 12 may first receive the target torque calculated in separate control processing (step S1). The target torque may be calculated on the basis of the driving operation and the predetermined limiting conditions. Furthermore, the processor 12 may acquire the measured value of the rotation speed of the first driving source 4 from the speed sensor 4a (step S2).

Thereafter, the processor 12 may cause the flow to branch out on the basis of a control state i (step S3). The control state i may take an initial value "0".

As a result, with the control state i=0, the flow may proceed to step S4, and thereupon, the processor 12 may output the target torque received in step S1 to the control circuit of the inverter 6 as the first torque command value (step S4).

Thereafter, the processor 12 may calculate the predicted locus of the operating point A of the first driving source 4, with the use of the first torque command value outputted at each control timing within a predetermined period of time retrospectively of the current time, and the value of the rotation speed of the first driving source 4 received at each control timing mentioned above (step S5). A length of the predicted locus to be calculated (period length) may be set to a period length in which the control method of the first driving source 4 is switched from the square wave control to the sine wave control before the operating point A meets the first resonance points X1. As a method of calculating the predicted locus, the method described above may be adopted.

Thereafter, the processor 12 may compare the predicted locus with the first resonance map M1, and determine whether or not the predicted locus meets the first resonance points X1 (step S6). In a case where the determination results in negation (NO), the processor 12 may cause the flow to return to step S1. In a case where the determination results in affirmation (YES), the processor 12 may switch the control state i to a value "1" to increase or decrease the first torque command value (step S7), and cause the flow to return to step S1.

As a result of the branching process in step S3, in a case with the control state i=1, the processor 12 may cause the flow to branch out to step S8. The processor 12 may determine whether the target torque in step S1 is equal to or smaller than the upper limit torque under the sine wave control at the rotation speed in step S2 (step S8). Because the target torque does not change rapidly, the target torque received in step S2 takes an equivalent value to the torque of the first driving source 4 on the occasion of the switching of the control method to the sine wave control.

In a case where the determination in step S8 results in affirmation (YES), the processor 12 may set the first torque command value to the target torque (step S9). In negation (NO), the processor 12 may decrease the first torque command value to the smaller value than the target torque, i.e., the smaller value than the upper limit torque as mentioned above (step S10). The processor 12 may output the first torque command value to the control circuit of the inverter 6 (step S11), and output a signal that designates the sine wave control, to the control circuit of the inverter 6 (step S12).

It is to be noted that in step S8, the processor 12 may determine whether or not the target torque is greater than the upper limit torque under the sine wave control, by determining whether or not the voltage phase on the occasion of the switching to the sine wave control exceeds the limit phase PL.

Thereafter, the processor 12 may determine whether or not the operating point A of the first driving source 4 has passed the first resonance points X1 (step S13). In negation (NO), the processor 12 may cause the flow to return to step S1. In affirmation (YES), the processor 12 may switch the control state i to the initial value "0" (step S14), and cause the flow to return to step S1.

With the control state i=0, the processor 12 may cause the flow to return to the loop processing of steps S1 to S6, to restore a normal control. Under the normal control, the target torque is outputted as the first torque command value without the designation of the control method.

It is to be noted that in step S10, in decreasing the first torque command value to the upper limit torque under the sine wave control or smaller, the processor 12 may decrease gradually the first torque command value to the upper limit torque or smaller. In decreasing the first torque command value to the smaller value in step S10, and thereafter, restoring the first torque command value to the target torque in step S4, the processor 12 may perform processing to restore gradually the first torque command value to the target torque.

In the torque command value calculation processing, the processor 12 may determine whether or not the operating point A of the first driving source 4 is located in the operating region R3. Alternatively, the processor 12 may determine whether or not the operating point A of the first driving source 4 is located in the operating regions R2 and R3. Solely in a case where the determination results in affirmation (YES), the processor 12 may carry out the process (step S5) of calculating the predicted locus and the process (step S6) of comparing the predicted locus with the first resonance map M1. With such control processing, it is possible to save the processor 12 a load of the control processing in the case with the first driving source 4 under the sine wave control.

With such torque command value calculation processing, the control operation as illustrated in FIGS. 6 and 7 is provided.

As described, according to the vehicle control apparatus 10 of the first embodiment, the storage 11 is configured to hold the first resonance map M1. The first resonance map M1 includes, as the first resonance points X1, the one or more operating points at which the resonance occurs in the operating region R3 of the first driving source 4 under the square wave control. In the case where the predicted route of the transition of the operating point A of the first driving source 4 meets the first resonance points X1, the processor is configured to switch the control method of the first driving source 4 from the square wave control to the sine wave control. This leads to the suppression of the occurrence of the electrical resonance in the first driving source 4, the inverter 6, and their vicinities in the case where the operating point A of the first driving source 4 meets the first resonance points X1. Hence, it is possible to suppress the generation of the noise sound caused by the electrical resonance.

Furthermore, according to the vehicle control apparatus 10 of the first embodiment, in switching the control method of the first driving source 4 to the sine wave control to avoid the resonance, the processor 12 may decrease the first torque command value in the case where the torque of the first driving source 4 is greater than the upper limit torque under the sine wave control. In one example, the processor 12 may decrease the first torque command value to the smaller value than the upper limit torque as mentioned above. Alternatively, the processor 12 may decrease gradually the first torque command value to the smaller value than the upper limit torque as mentioned above. Hence, it is possible to suppress the voltage phase under the sine wave control from exceeding the limit phase PL, and suppress the first torque command value from deviating from the torque of the first driving source 4.

Second Embodiment

Figure 9:
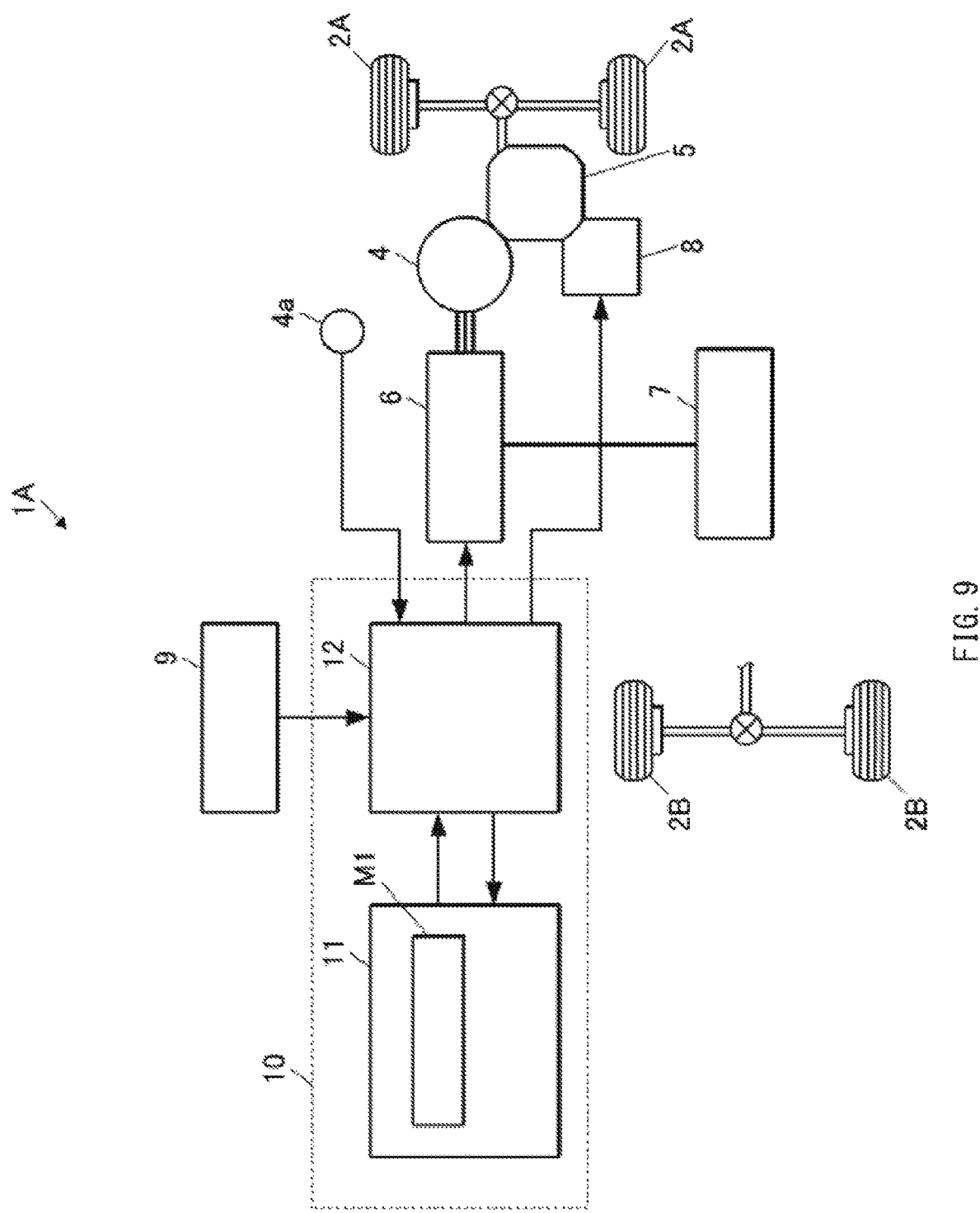
FIG. 9 is a block diagram of a vehicle on which a vehicle control apparatus according to a second embodiment of the disclosure is mounted.

FIG. 9 is a block diagram of a vehicle on which a vehicle control apparatus according to a second embodiment is mounted. A vehicle 1A on which a vehicle control apparatus 10 of the second embodiment is mounted may have a similar configuration to the first embodiment. In addition, the vehicle 1A may include, without limitation, a second driving source 5. The second driving source 5 is configured to output torque to the first wheels 2A. It is to be noted that constituent elements similar to those of the first embodiment are denoted by the same reference characters, and description thereof is omitted.

The second driving source 5 may include, without limitation, an engine, or an internal combustion engine. The vehicle 1A may include, without limitation, auxiliaries 8. The auxiliaries 8 are configured to drive the second driving source 5. It is to be noted that the second driving source 5 may include, without limitation, an electric motor that is not configured to be subjected to the square wave control. The first driving source 4 and the second driving source 5 may output torque respectively to separate wheels, e.g., the first wheels 2A and second wheels 2B, instead of outputting torque to the same wheels, i.e., the first wheels 2A.

The processor 12 may calculate a second torque command value, in addition to the first torque command value. The second torque command value indicates a value of the torque to be outputted by the second driving source 5. The second torque command value may be outputted to a control circuit of the auxiliaries 8. The control circuit of the auxiliaries 8 may make a feedback control to allow torque that matches the second torque command value to be outputted from the second driving source 5, to cause the auxiliaries 8 to operate.

As with the first embodiment, the processor 12 is configured to switch the control method of the first driving source 4 to the sine wave control in the case where the predicted locus of the operating point A of the first driving source 4 meets the first resonance points X1. Furthermore, at this occasion, the processor 12 may decrease the first torque command value to, for example, the upper limit torque or smaller in a case where the torque of the first driving source 4 is greater than the upper limit torque under the sine wave control, i.e., the upper limit torque at the rotation speed at the relevant time.

Furthermore, in the second embodiment, in decreasing the first torque command value in accompaniment with the switching of the control method of the first driving source 4, the processor 12 may increase the second torque command value. An amount of the increase in the second torque command value may be set, in corresponding relation to an amount of the decrease in the first torque command value, to reduce an amount of change in total torque of the first driving source and the second driving source 5, or to cause the total torque of the first driving source 4 and the second driving source 5 to be close to the target torque of the whole vehicle 1A.

Operation Example

Figure 10A:
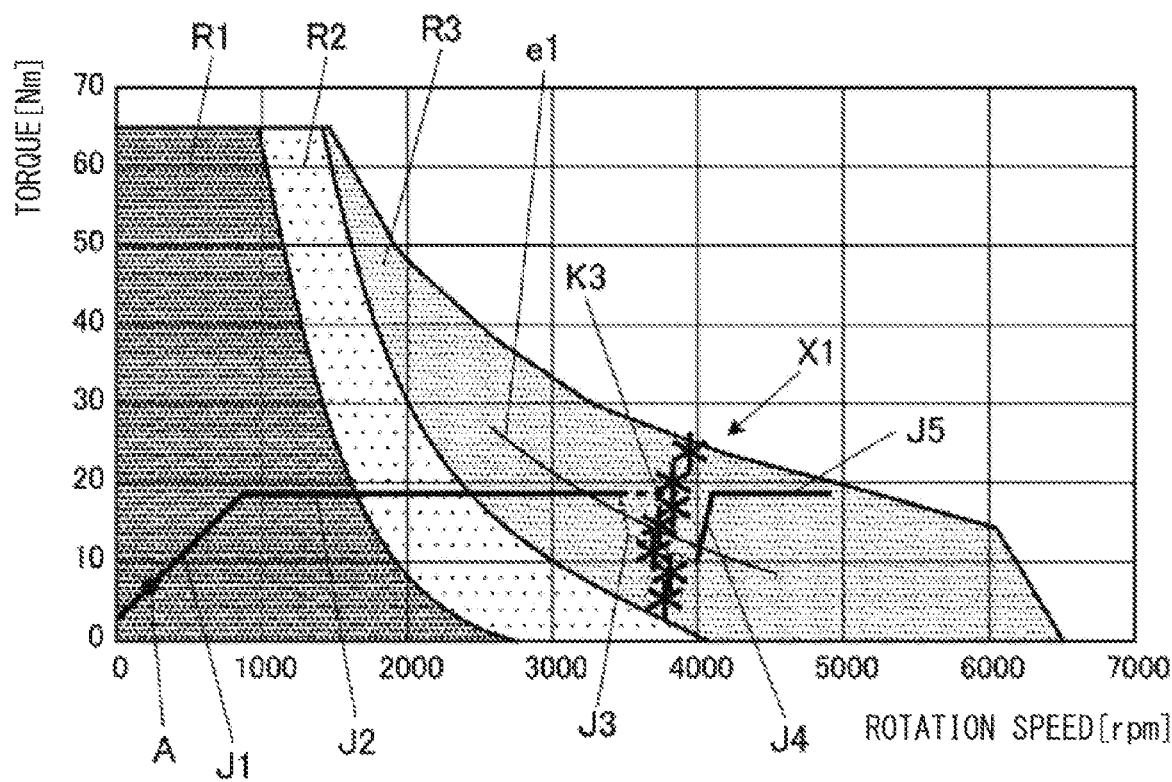
FIG. 10A is a graph that illustrates an example of workings of the vehicle control apparatus according to the second embodiment, illustrating an example of transitions of an operating point of a first driving source.
Figure 10B:
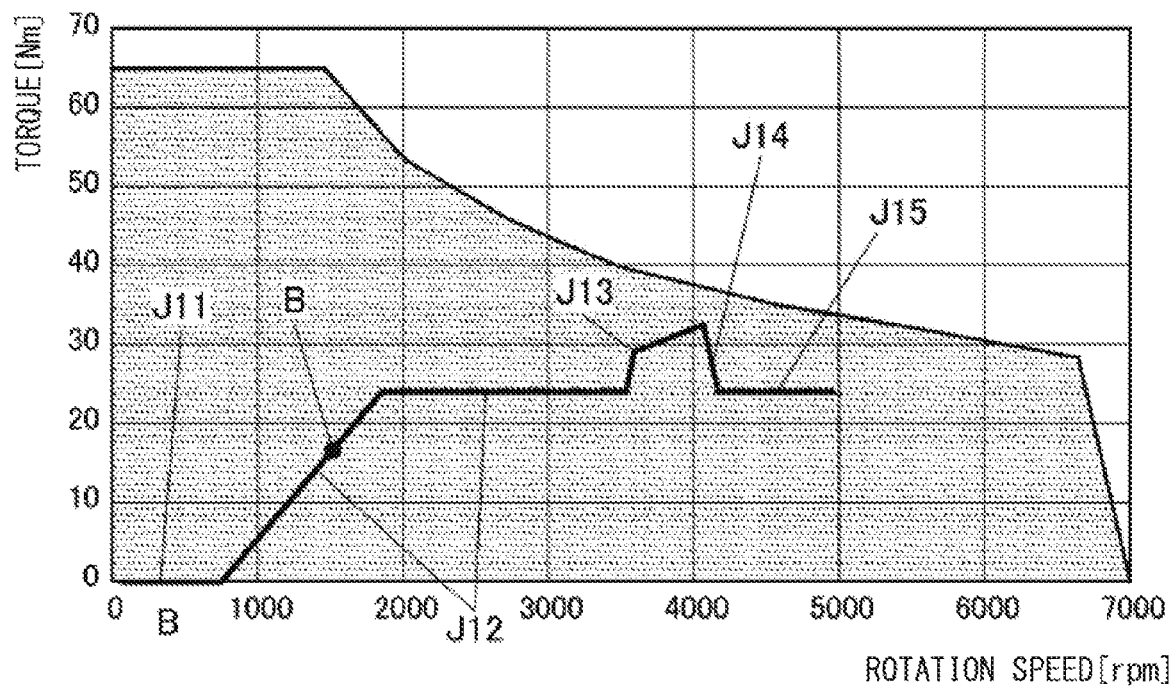
FIG. 10B is a graph that illustrates an example of the workings of the vehicle control apparatus according to the second embodiment, illustrating an example of transitions of an operating point of a second driving source.

FIGS. 10A and 10B illustrate examples of workings of the vehicle control apparatus according to the second embodiment. FIG. 10A illustrates transitions of the operating point A of the first driving source 4 in one travel example of the vehicle 1A. FIG. 10B illustrates transitions of an operating point B of the second driving source 5 in the same travel example as in FIG. 10A. Timing at which the operating point A of the first driving source 4 makes the transitions along the loci J1 to J5 in FIG. 10A matches timing at which the operating point B of the second driving source 5 makes the transitions along loci J11 to J15 in FIG. 10B.

In the travel example in FIGS. 10A and 10B, the vehicle speed is gradually increased by the output of the torque of the first driving source 4 and the second driving source 5. This is accompanied by a gradual increase in the rotation speeds of the first driving source 4 and the second driving source 5. In the travel example, the driver keeps the amount of the accelerator operation constant during a period of time in which the operating point A makes the transitions along the loci J3 and J4.

In FIG. 10A, as with the first embodiment, the locus J3 indicates the locus of the operating point A of the first driving source 4 in the case where the predicted locus K3 of the operating point A meets the first resonance points X1. In other words, on the locus J3, the processor 12 switches the control method of the first driving source 4 to the sine wave control, and the first torque command value is lowered to the upper limit torque under the sine wave control or smaller.

In the second embodiment, in decreasing the first torque command value as indicated by the locus J3, the processor 12 may increase the second torque command value (locus J13 in FIG. 10B). Thus, in the case where the first torque command value deviates from the target torque of the first driving source 4, increasing the second torque command value from the target torque of the second driving source 5 make it possible to reduce torque fluctuation of the whole vehicle 1A. In other words, it is possible to allow the torque of the whole vehicle 1A to be close to target torque of the whole vehicle 1A.

It is a possible assumption that the control method of the first driving source 4 is switched to the sine wave control, and the operating point A of the first driving source 4 meets the first resonance points X1, but the torque of the first driving source 4 is equal to or smaller than the upper limit torque under the sine wave control. In such a case, solely the switching of the control of the first driving source 4 may be made, without increasing or decreasing the first torque command value and the second torque command value as indicated by the loci J3 and J13.

<Control Processing>

Figure 11A:
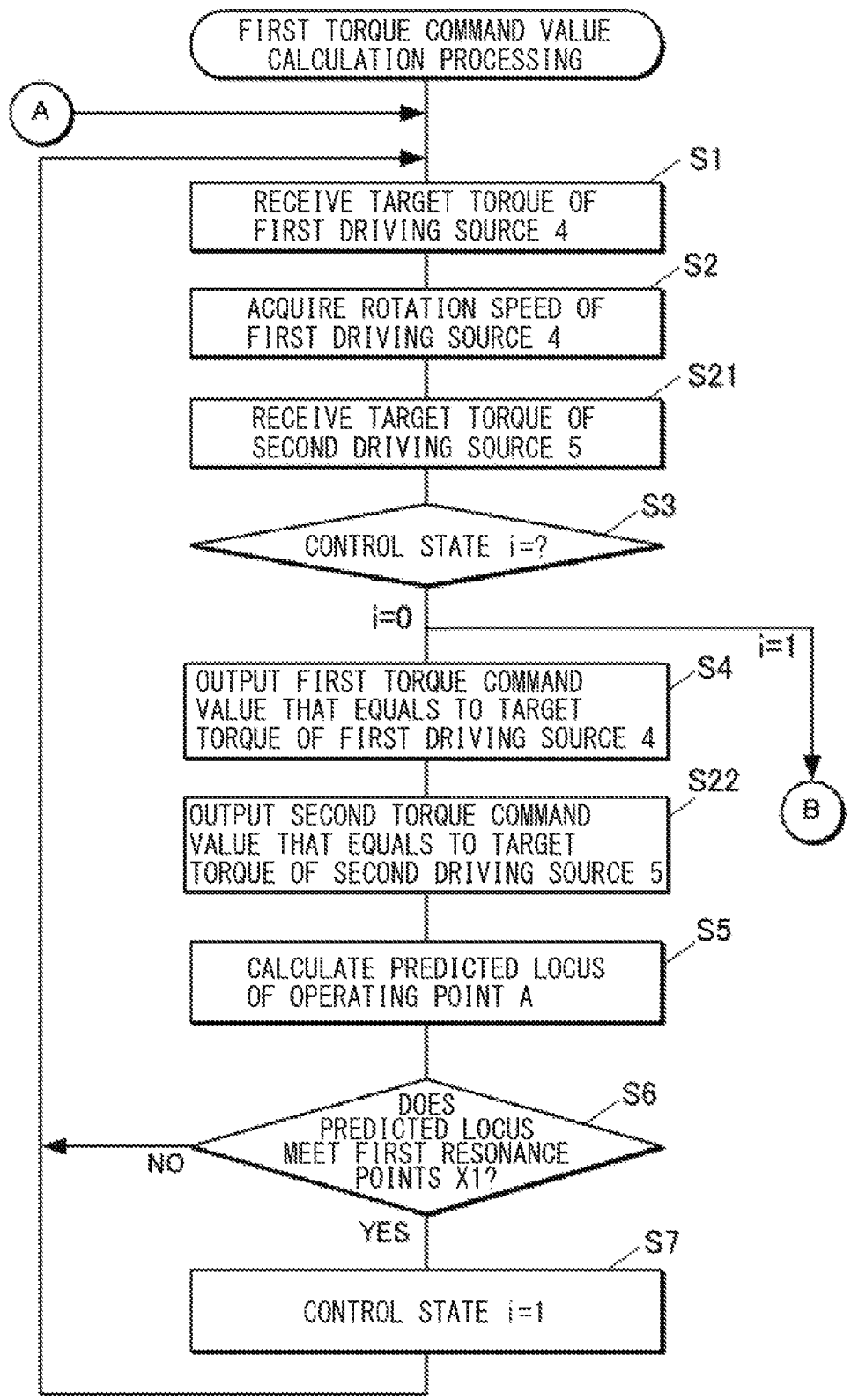
FIG. 11A is a first portion of a flowchart of torque command value calculation processing to be carried out by a processor.
Figure 11B:
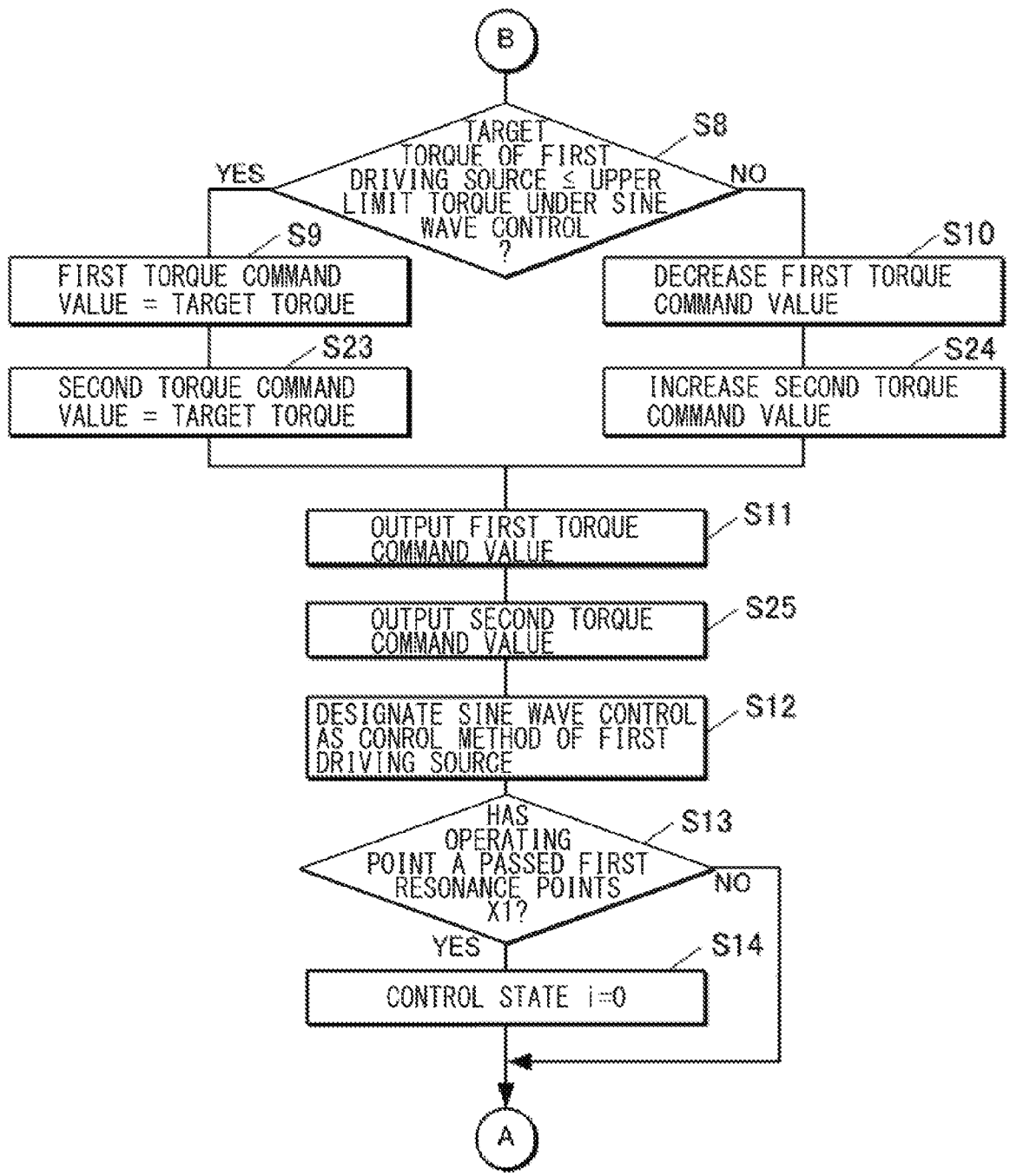
FIG. 11B is a second portion of the flowchart of the torque command value calculation processing to be carried out by the processor.

Description now moves on to an example of control processing of the processor, to realize the control operation as described above. FIGS. 11A and 11B are flowcharts of torque command value calculation processing to be carried out by the processor. In FIGS. 11A and 11B, steps S1 to S14 are the same as steps S1 to S14 (FIG. 8) of the torque command value calculation processing of the first embodiment. Detailed description of the same steps is omitted.

In the torque command value calculation processing of the second embodiment, after step S2, the processor 12 may receive target torque of the second driving source 5 calculated by separate control processing (step S21).

After step S4, the processor 12 may output the target torque received in step S21, as the second torque command value, to the control circuit of the auxiliaries 8 (step S22).

After step S9, the processor 12 may set the second torque command value as the target torque of the second driving source 5 (step S23).

After step S10, the processor 12 may increase the second torque command value to a greater value than the target torque of the second driving source 5 (step S24). The amount of the increase in the second torque command value may be equivalent to the amount of the decrease in the first torque command value in step S10.

After step S11, the processor 12 may output the second torque command value to the control circuit of the auxiliaries (step S25).

In increasing the second torque command value in step S24, the processor 12 may increase the second torque command value, to allow the second torque command value to become greater gradually. In the case where the second torque command value is increased to the greater value in step S24, and thereafter, the second torque command value is restored to the target torque in step S22, the processor 12 may perform processing of restoring the second torque command value gradually to the target torque.

With such control processing, the control operation illustrated in FIGS. 10A and 10B is provided.

As described, according to the vehicle control apparatus 10 of the second embodiment, the processor 12 may increase the second torque command value, in decreasing the first torque command value to switch the control method of the first driving source 4. Hence, it is possible to reduce the torque fluctuation of the whole vehicle 1A, in suppressing the noise sound caused by the electrical resonance occurring in the first driving source 4, the inverter 6, and their vicinities. In other words, it is possible to allow the torque of the whole vehicle 1A to be close to the target torque of the whole vehicle 1A.

Third Embodiment

Figure 12:
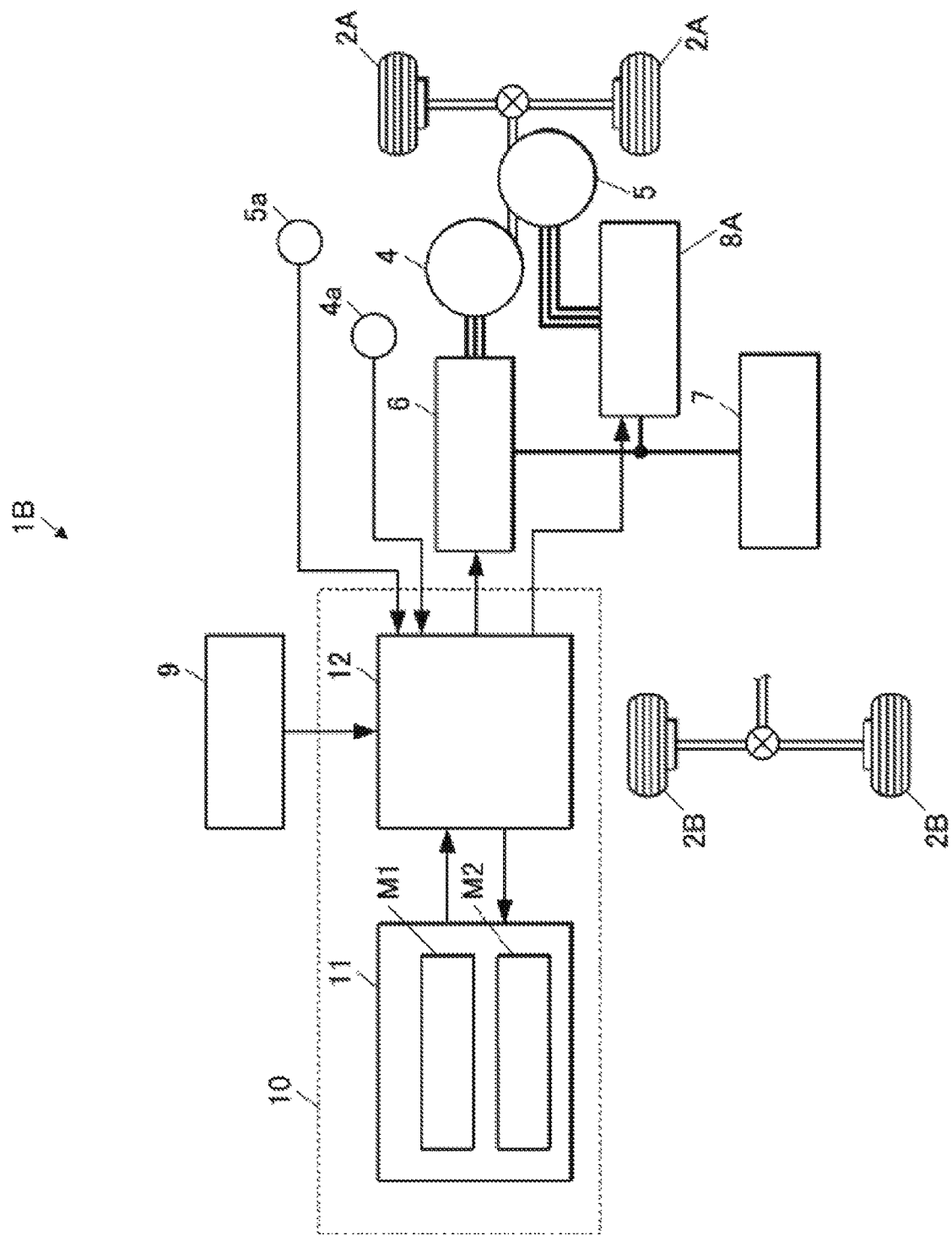
FIG. 12 is a block diagram of a vehicle on which a vehicle control apparatus according to a third embodiment of the disclosure is mounted.
Figure 13:
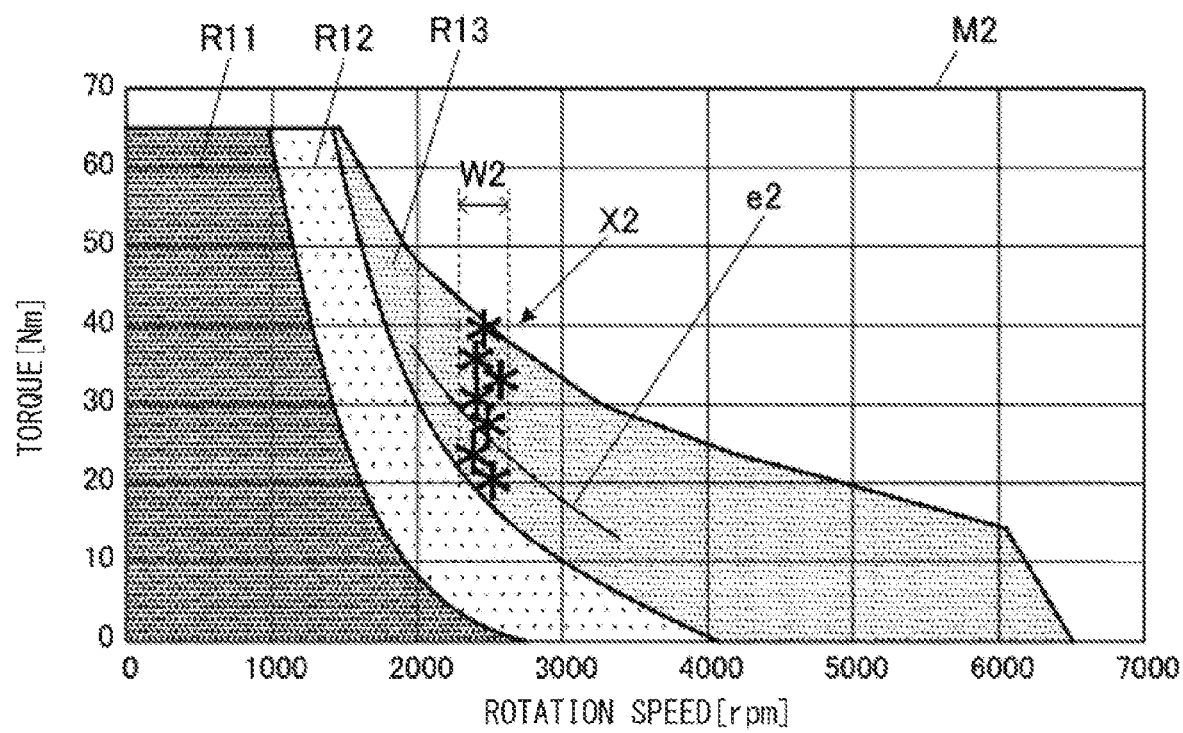
FIG. 13 is a graph that illustrates a second resonance map held in a storage.

FIG. 12 is a block diagram of a vehicle on which a vehicle control apparatus according to a third embodiment is mounted. FIG. 13 illustrates a second resonance map held in a storage.

A vehicle 1B on which a vehicle control apparatus 10 of the third embodiment is mounted differs from the second embodiment mainly in that the second driving source 5 includes an electric motor that is configured to be subjected to the square wave control. The processor 12 may calculate not only the first torque command value but also the second torque command value. The second torque command value indicates the value of the torque to be outputted to the first wheels 2A. The second torque command value may be outputted to a control circuit of an inverter 8A. The inverter 8A is configured to drive the second driving source 5. The control circuit of the inverter 8A may make a feedback control to allow the torque that matches the second torque command value to be outputted from the second driving source 5, to control operation of the inverter 8A. The vehicle 1B may include, without limitation, a speed sensor 5a. The speed sensor 5a is configured to measure directly or indirectly a rotation speed of the second driving source 5. A measured value of the speed sensor 5a may be sent to the processor 12.

The storage 11 of the vehicle control apparatus 10 may hold a second resonance map M2 in addition to the first resonance map M1 described in the first embodiment. As illustrated in FIG. 13, the second resonance map M2 may include, as second resonance points X2, one or more operating points at which resonance occurs in the second driving source 5 or its vicinities in an operating region R13 of the second driving source 5 under the square wave control. The second resonance map M2 may be created in advance on the basis of, for example, tests or simulation, and held in the storage 11.

Operating regions of the second driving source 5 may be represented by two-dimensional regions that have, as components, the rotation speed of the second driving source 5 and the torque of the second driving source 5. Any point in the relevant regions corresponds to one operating point of the second driving source 5. The operating regions of the second driving source 5 may include, without limitation, an operating region R11, an operating region R13, and an operating region R12. In the operating region R11, the sine wave control is carried out. In the operating region R13, the square wave control is carried out. In the operating region R12, the transient control between the sine wave control and the square wave control is carried out.

In the operation regions of the second driving source 5, the operating region R13 in which the square wave control is carried out overlaps with an operating region in which the sine wave control is available. FIG. 13 illustrates an upper borderline e2 of the operating region in which the sine wave control is available. The borderline e2 corresponds to operating points at which a voltage phase of the inverter 8A under the sine wave control reaches a limit phase. In other words, in a case where the operating point of the second driving source 5 is located on the borderline e2, a value of the torque at the relevant operating point corresponds to the upper limit torque the second driving source 5 is configured to output under the sine wave control, i.e., the upper limit torque at the rotation speed at the relevant operating point.

Thus, in a case where the operating point of the second driving source 5 is located in the operating region R13 under the square wave control, but located on lower side of the borderline e2, it is possible to switch the control method of the second driving source 5 from the square wave control to the sine wave control while maintaining the torque of the second driving source 5. In contrast, in a case where the operating point of the second driving source 5 is located in the operating region R3 under the square wave control and on upper side of the borderline e2, it is not possible to switch the control method of the second driving source 5 from the square wave control to the sine wave control while maintaining the torque of the second driving source 5. In this case, lowering the torque of the second driving source 5 to shift the operating point to the lower side of the borderline e2 makes it possible to switch the control method of the second driving source 5 from the square wave control to the sine wave control. The upper side of the borderline e2 means side of the borderline e2 on which is torque is greater. The lower side of the borderline e2 means side of the borderline e2 on which torque is smaller.

On the occasion that the second driving source 5 is in operation, the switching between the sine wave control, the square wave control, and the transient control may be made by the control circuit of the inverter 8A in accordance with the second torque command value and the rotation speed of the second driving source 5. In this embodiment, in a case where the operating point of the second driving source 5 is located in an overlap between the operating region R13 and the operating region in which the sine wave control is available, the processor 12 is configured to output a signal that designates the control method, to the control circuit of the inverter 8A. On the basis of the signal, the inverter 8A is configured to make designation as to whether to carry out the sine wave control or the square wave control.

A plurality of the second resonance points X2 included in the second resonance map M2 is included in the operating region R13 in which the square wave control is carried out. The plurality of the second resonance points X2 typically gathers in a specific rotation speed range W2 in the operating region R13. The second resonance points X2 may sometimes gather in the single rotation speed range W2, or alternatively, the second resonance points X2 may sometimes gather in a plurality of the specific rotation speed ranges W2.

In the vehicle 1B, in the case where both the first driving source 4 and the second driving source 5 output torque, the rotation speed of the first driving source 4 and the rotation speed of the second driving source 5 are restricted by a predetermined first ratio. For example, let us assume a case where rotational motion of the first driving source 4 is outputted to the first wheels 2A at a reduction ratio of ¼, and rotational motion of the second driving source 5 is outputted to the first wheel 2A at a reduction ratio of ½. In this case, the rotation speed of the first driving source 4 takes a value obtained by multiplying the rotation speed of the second driving source 5 by the first ratio "2". In the following, description is given of a case where the first ratio is "1", i.e., a case where the rotation speed of the first driving source 4 matches the rotation speed of the second driving source 5. However, the first ratio may take other values than "1".

In the third embodiment, setting may be provided that hinders the operating point of the first driving source 4 and the operating point of the second driving source 5 from meeting respectively the first resonance points X1 and the second resonance points X2 at the same time.

The setting as mentioned above may be provided by allowing a resonance frequency characteristic of the first driving source 4 and its peripheral circuit, and a resonance frequency characteristic of the second driving source 5 and its peripheral circuit to differ, or by allowing a gear ratio of the first driving source 4 and a gear ratio of the second driving source 5 to differ. Alternatively, the setting as mentioned above may be provided by allowing both the resonance frequency characteristics as mentioned above and the gear ratios as mentioned above to differ.

As a result, the rotation speed range W1 (see FIG. 2) of the first resonance map M1 in which the first resonance points X1 are located is devoid of an overlap with a region obtained by multiplying, by the first ratio "1", the rotation speed range W2 (see FIG. 13) of the second resonance map M2 in which the second resonance points X2 are located.

In the third embodiment, the processor 12 may make a similar control of the first driving source 4 to the first embodiment.

In the third embodiment, the processor 12 may further perform similar processing on the second driving source 5 to the processing on the first driving source 4 described in the first embodiment. The processor 12 may switch the control method of the second driving source 5 to the sine wave control before the operating point B of the second driving source 5 meets the second resonance points X2. Furthermore, in a case where torque at the relevant time is greater than the upper limit torque under the sine wave control, the processor 12 may decrease the second torque command value. In one example, the processor 12 may decrease the second torque command value to a smaller value than the target torque, to bring the second torque command value to the upper limit torque or smaller.

Furthermore, in decreasing the second torque command value to switch the control method of the second driving source 5 to the sine wave control, the processor 12 may increase the first torque command value. In one example, the processor 12 may increase the first torque command value to a greater value than the target torque of the first driving source 4, to reduce the torque fluctuation of the whole vehicle 1B. Alternatively, the processor 12 may increase the first torque command value to the greater value than the target torque of the first driving source 4, to allow the torque of the whole vehicle 1B to be close to the target torque of the whole vehicle 1B.

Similarly, in decreasing the first torque command value to switch the control method of the first driving source 4 to the sine wave control, the processor 12 may increase the second torque command value. In one example, the processor 12 may increase the second torque command value to a greater value than the target torque of the second driving source 5, to reduce the torque fluctuation of the whole vehicle 1B. Alternatively, the processor 12 may increase the second torque command value to the greater value than the target torque of the second driving source 5, to allow the torque of the whole vehicle 1B to be close to the target torque of the whole vehicle 1B.

Operation Example

Figure 14A:
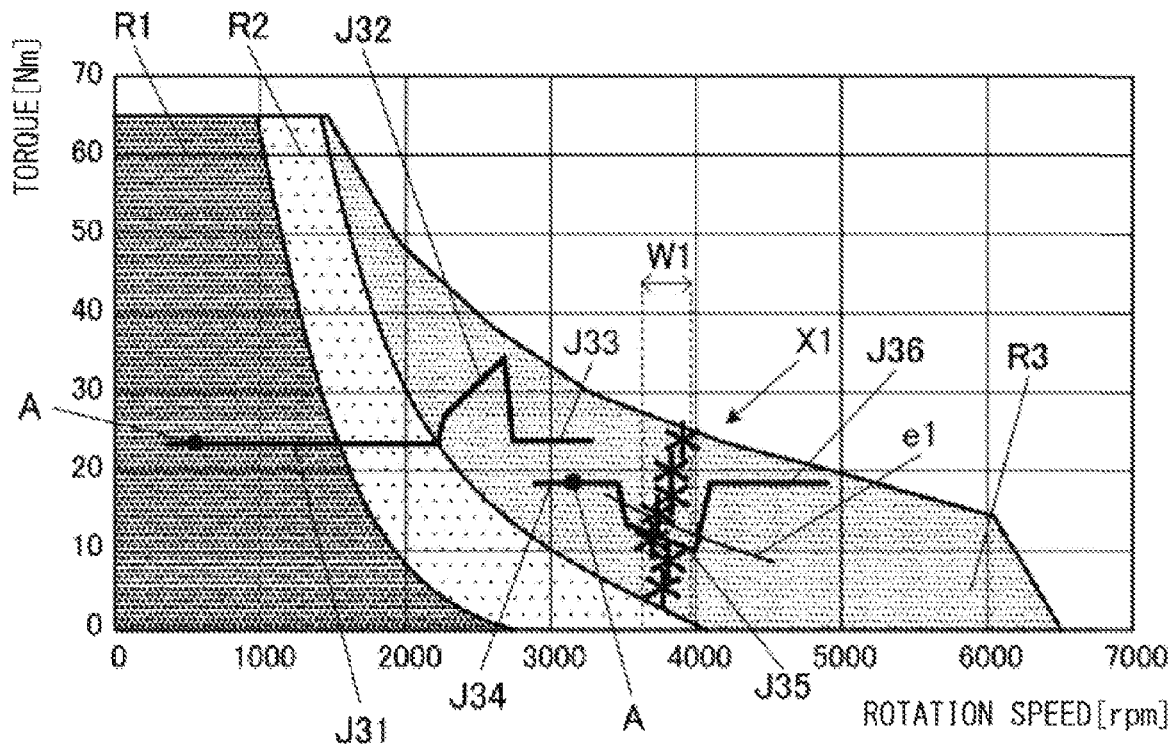
FIG. 14A is a graph that illustrates an example of workings of the vehicle control apparatus according to the third embodiment, illustrating an example of transitions of an operating point of a first driving source.
Figure 14B:
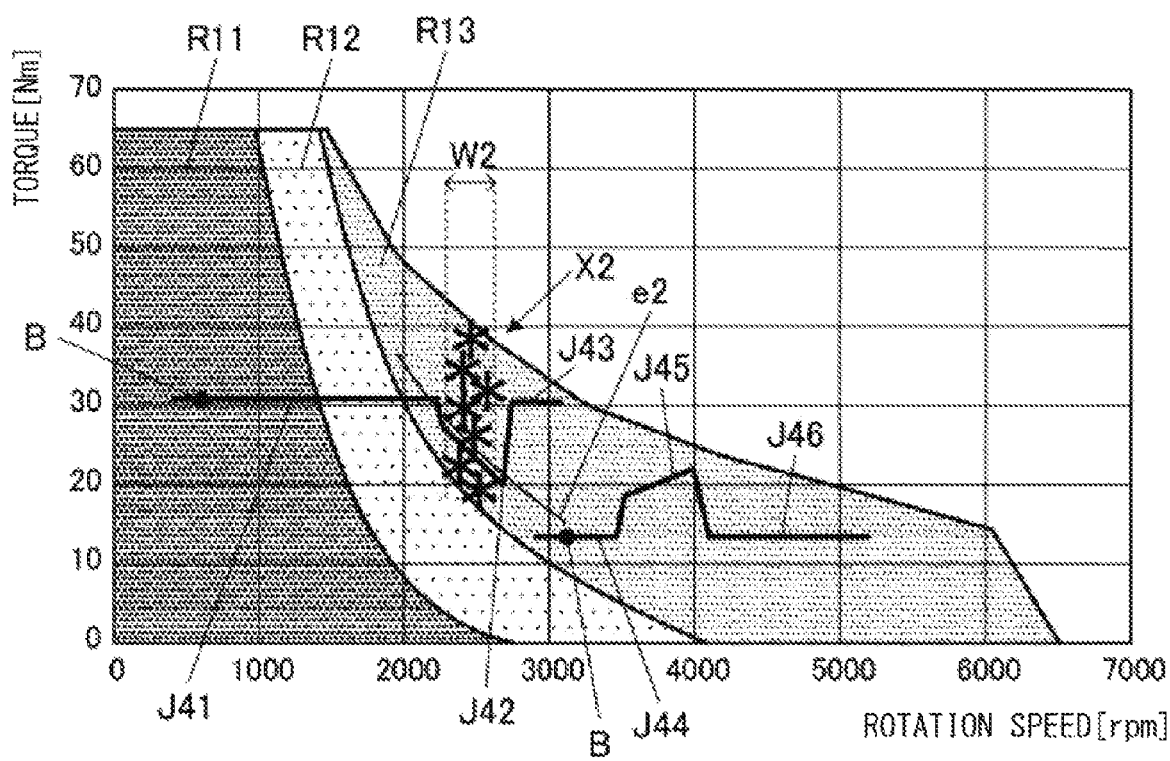
FIG. 14B is a graph that illustrates an example of the workings of the vehicle control apparatus according to the third embodiment, illustrating an example of transitions of an operating point of a second driving source.

FIGS. 14A and 14B illustrate examples of workings of the vehicle control apparatus according to the third embodiment. FIG. 14A illustrates transitions of the operating point A of the first driving source 4 in two travel examples of the vehicle 1B. FIG. 14B illustrates transitions of the operating point B of the second driving source 5 in the same two travel examples as in FIG. 14A. In the first travel example, the operating point A of the first driving source 4 makes sequential transitions along loci J31 to J33, while the operating point B of the second driving source 5 makes sequential transitions along loci J41 to J43. In the second travel example, the operating point A of the first driving source 4 makes sequential transitions along loci J34 to J36, while the operating point B of the second driving source 5 makes sequential transitions along loci J44 to J46. Timing at which the operating point A of the first driving source 4 makes the transitions along the loci J31 to J36 in FIG. 14A matches timing at which the operating point B of the second driving source 5 makes the transitions along the loci J41 to J46 in FIG. 14B.

In the two travel examples in FIGS. 14A and 14B, the vehicle speed is gradually increased by the output of the torque of the first driving source 4 and the second driving source 5. This is accompanied by a gradual increase in the rotation speeds of the first driving source 4 and the second driving source 5. In the first travel example, the driver keeps a constant operation, with a great amount of the accelerator operation. In the second travel example, the driver keeps a constant operation, with a small amount of the accelerator operation.

In FIG. 14B, the locus J42 indicates the transitions of the operating point B in a case where the operating point B meets the second resonance points X2. On the locus J42, the processor 12 may switch the control method of the second driving source 5 to the sine wave control, and decrease the second torque command value to the upper limit torque under the sine wave control or smaller. After the operating point B passes the second resonance points X2, the second torque command value is restored to the target torque of the second driving source 5.

In FIG. 14A, the locus J32 indicates the transitions of the operating point A of the first driving source 4 in linkage with the decrease in the second torque command value along the locus J42. In other words, on the locus J32, the processor 12 may increase the first torque command value in linkage with the decrease in the second torque command value, and thereafter, the processor 12 may restore the first torque command value to the target torque of the first driving source 4.

It is a possible assumption that the predicted locus of the operating point B of the second driving source 5 meets the second resonance points X2, causing the control method of the second driving source 5 to be switched to the sine wave control, but the torque of the second driving source 5 is equal to or smaller than the upper limit torque under the sine wave control at the rotation speed of the second driving source 5 at the relevant time. In such a case, solely the switching of the control of the second driving source 5 may be made, without increasing or decreasing the first torque command value and the second torque command value as indicated by the loci J32 and J42.

In FIG. 14A, the locus J35 indicates the transitions of the operating point A of the first driving source 4 on the occasion that the operating point A meets the first resonance points X1. That is, on the locus J35, the processor 12 may switch the control method of the first driving source 4 to the sine wave control, and the first torque command value may be decreased to the upper limit torque under the sine wave control or smaller.

In FIG. 14B, the locus J45 indicates the transitions of the operating point B of the second driving source 5 in linkage with the decrease in the first torque command value along the locus J35. That is, on the locus J45, the processor 12 may increase the second torque command value in linkage with the decrease in the first torque command value, and thereafter, the processor 12 may restore the second torque command value to the target torque of the second driving source 5.

It is also a possible assumption that the predicted locus of the operating point A of the first driving source 4 meets the first resonance points X1, causing the control method of the first driving source 4 to be switched to the sine wave control, but the target torque of the first driving source 4 is equal to or smaller than the upper limit torque under the sine wave control at the rotation speed of the first driving source 4 at the relevant time. In such a case, solely the switching of the control of the first driving source 4 may be made, without increasing or decreasing the first torque command value and the second torque command value as indicated by the loci J35 and J45.

As mentioned above, the rotation speed range W1 of the first driving source 4 in which the first resonance points X1 are located is devoid of the overlap with the rotation speed range W2 of the second driving source 5 in which the second resonance points X2 are located, i.e., the range obtained by multiplying, by the first ratio "1", the rotation speed range W2 of the second driving source 5 in which the second resonance points X2 are located. This suppresses a first control and a second control from being carried out at the same time. The first control includes switching the control method of the first driving source 4 because of the first resonance points X1. The second control includes switching the control method of the second driving source 5 because of the second resonance points X2. Hence, it is possible to suppress the process of decreasing the first torque command value on the occasion of the first control as mentioned above and the process of decreasing the second torque command value on the occasion of the second control as mentioned above from being carried out at the same time.

<Control Processing>

Figure 15A:
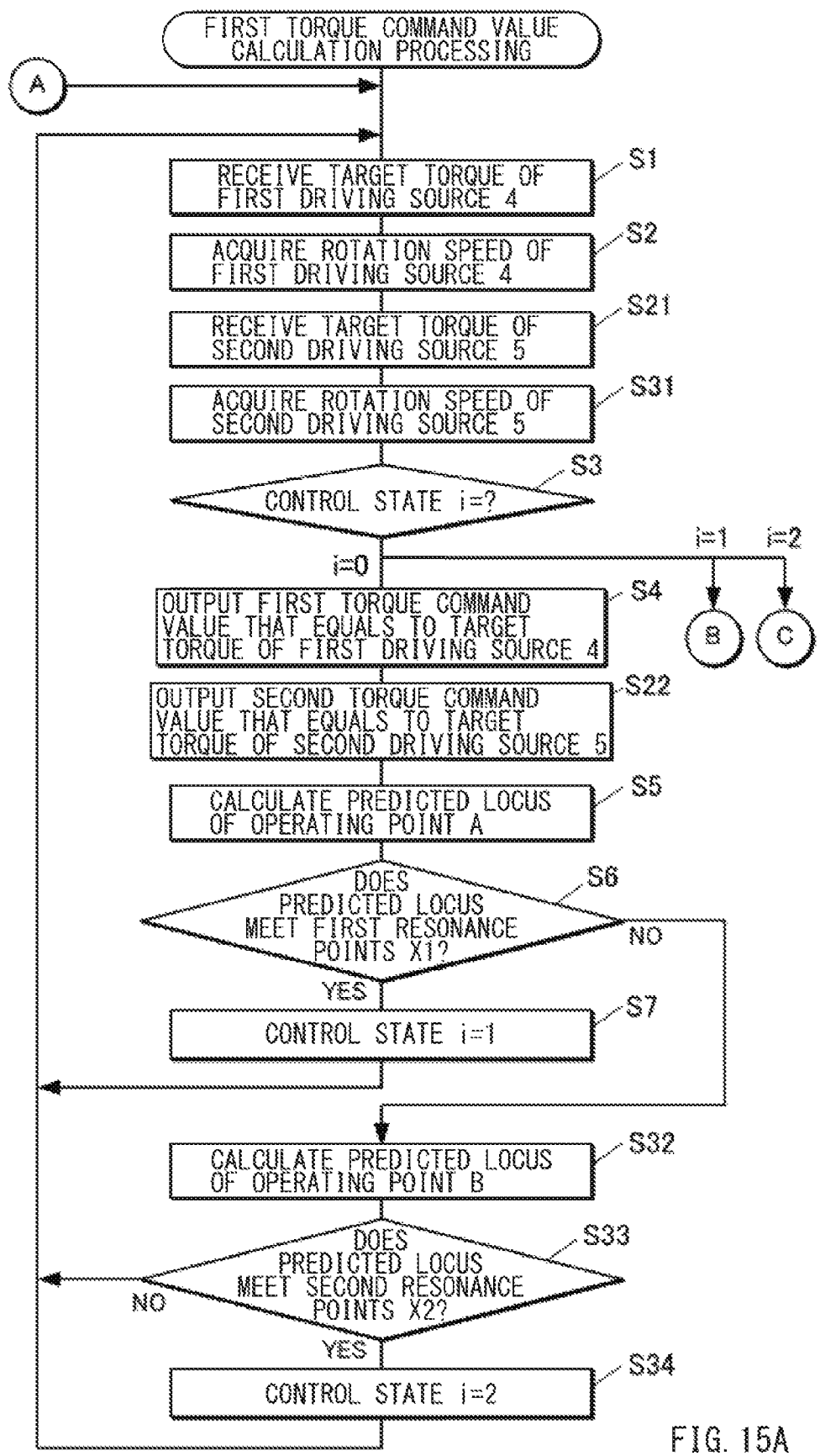
FIG. 15A is a first portion of a flowchart of torque command value calculation processing to be carried out by a processor.
Figure 15B:
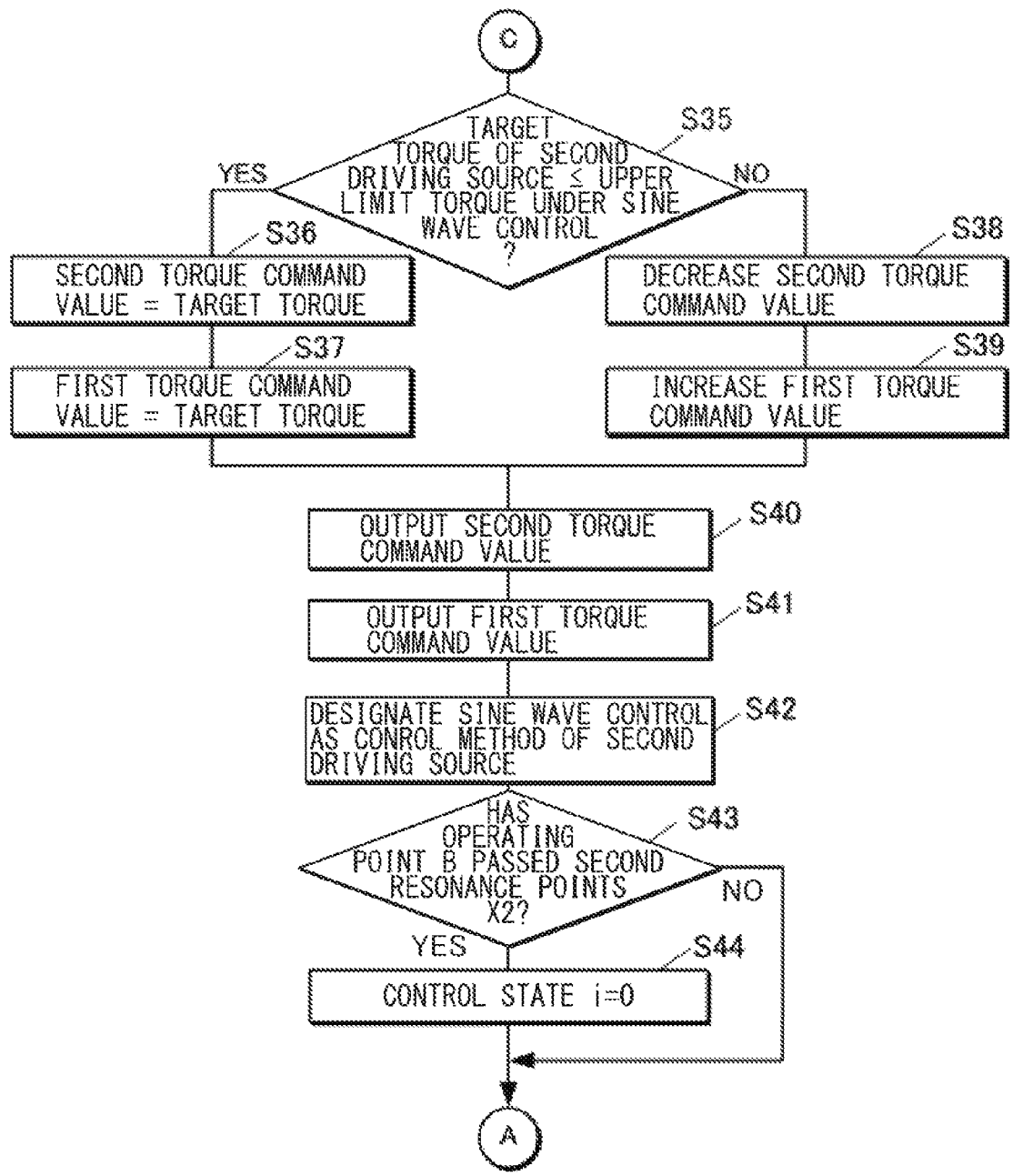
FIG. 15B is a third portion of the flowchart of the torque command value calculation processing to be carried out by the processor.

Description is given next of an example of control processing of the processor, to realize the control operation described above. FIGS. 15A and 15B illustrate respectively first and third portions of a flowchart of torque command value calculation processing to be carried out by the processor. In FIG. 15A, steps S1, S2, S4 to S7, S21, and S22 are the same as steps S1, S2, S4 to S7, S21, and S22 (FIG. 11A) of the torque command value calculation processing of the second embodiment. In FIG. 15A, the branching process in step S3 in the case with the control state i=1 is the same as that in FIG. 11B. Detailed description of the same steps is omitted.

In the torque command value calculation processing of the third embodiment, after step S21, the processor 12 may acquire the measured value of the rotation speed of the second driving source 5 from the speed sensor 5a (step S31).

The branching process in step S3 may further include branching with the control state i=2 in addition to branching with the control state i=1.

In the torque command value calculation processing of the third embodiment, in step S6 in FIG. 15A, in the case with the determination in negation (NO), the processor 12 may calculate the predicted locus of the operating point B of the second driving source 5 (step S32). A calculation method of the predicted locus is the same as the calculation method of the predicted locus of the operating point A of the first driving source 4. Each operating point on the predicted locus corresponds to the predicted route of the transition of the operating point B. Thereafter, the processor 12 may compare the predicted locus with the second resonance map M2, and determine whether or not the predicted locus meets the second resonance points X2 (step S33). In a case with a determination in negation (NO), the processor 12 may cause the flow to return to step S1. In a case with a determination in affirmation (YES), the processor 12 may switch the control state i to a value "2" to avoid the resonance around the second driving source 5 (step S34), and cause the flow to return to step S1.

As a result of the branching process in step S3, in the case with the control state i=1, the similar control processing to the second embodiment may be carried out from step S8 (FIG. 11B). In the case with the control state i=2, the processor 12 may cause the flow to proceed to step S35. A processing sequence of steps S35 to S44 may be similar to that of steps S8 to S14, and S23 to S25 in FIG. 11B. Steps S35 to S44 are equivalent to steps S8 to S14, and S23 to S25 in which the processing on the first driving source 4 is replaced with the processing on the second driving source 5. Accordingly, detailed description of steps S35 to S44 is omitted.

With such torque command value calculation processing, the operation as illustrated in FIGS. 14A and 14B is provided.

As described, according to the vehicle control apparatus 10 of the third embodiment, the control method of the second driving source 5 may be switched to the sine wave control before the operating point B meets the second resonance points X2. This leads to suppression of the electrical resonance occurring in the second driving source 5, the inverter 8A, and their vicinities. Hence, it is possible to suppress the generation of the noise sound caused by the electrical resonance. Furthermore, in switching the control method of the second driving source 5 to the sine wave control to avoid the resonance, in the case where the torque of the second driving source 5 is greater than the upper limit torque under the sine wave control, the second torque command value may be decreased to the smaller value. This makes it possible to suppress the voltage phase under the sine wave control of the second driving source 5 from exceeding the limit phase PL, and to suppress the second torque command value and the torque of the second driving source 5 from deviating from each other.

Furthermore, according to the vehicle control apparatus 10 of the third embodiment, the rotation speed range W1 of the first resonance map M1 in which the first resonance points X1 are located is devoid of the overlap with the range obtained by multiplying, by the first ratio "1", the rotation speed range W2 of the second resonance map M2 in which the second resonance points X2 are located. See FIGS. 2 and 13. This suppresses the first control and the second control from being carried out at the same time. The first control includes switching the control method of the first driving source 4 because of the first resonance points X1. The second control includes switching the control method of the second driving source 5 because of the second resonance points X2. Hence, it is possible to suppress the process of decreasing the first torque command value on the occasion of the first control as mentioned above and the process of decreasing the second torque command value on the occasion of the second control as mentioned above from being carried out at the same time.

Fourth Embodiment

Figure 16:
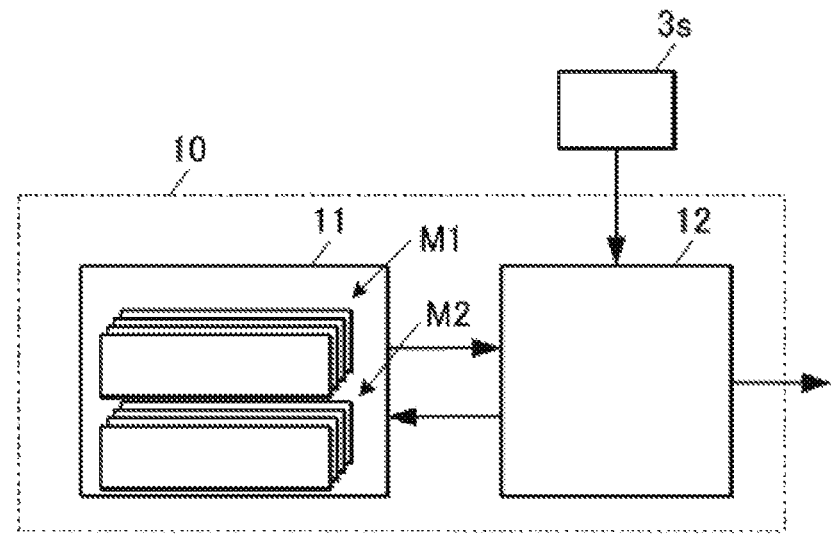
FIG. 16 is a block diagram of a vehicle control apparatus according to a fourth embodiment of the disclosure.

FIG. 16 is a block diagram of a vehicle control apparatus according to a fourth embodiment. The vehicle control apparatus 10 according to the fourth embodiment may be mounted on the vehicle 1B of the third embodiment described above. In the fourth embodiment, the storage 11 of the vehicle control apparatus 10 may hold a plurality of the first resonance maps M1 and a plurality of the second resonance maps M2. The plurality of the first resonance maps M1 and the plurality of the second resonance maps M2 correspond to respective ones of a plurality of environmental conditions. The environmental conditions may include, without limitation, an outside air temperature, a temperature of the first driving source 4 and the inverter 6, a temperature of the second driving source 5 and the inverter 8A, and an output voltage of the battery 7. The environmental conditions may include any other environmental conditions that influence the positions of the first resonance points X1 in the operating regions of the first driving source 4 and the positions of the second resonance points X2 in the operating regions of the second driving source 5. The plurality of the first resonance maps M1 and the plurality of the second resonance maps M2 may be held in association with the respective ones of the plurality of the environmental conditions.

The vehicle 1B on which the vehicle control apparatus 10 is mounted may include, without limitation, an environment sensor 3s. The environment sensor 3s is configured to measure the environmental conditions. A measured value of the environment sensor 3s may be outputted to the processor 12.

Figure 17:
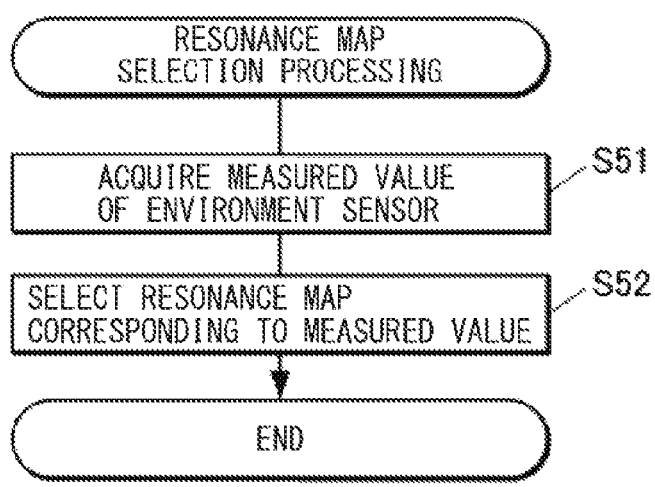
FIG. 17 is a flowchart of resonance map selection processing to be carried out by a processor in the fourth embodiment.

FIG. 17 is a flowchart of resonance map selection processing to be carried out by the processor according to the fourth embodiment. The processor 12 may carry out the resonance map selection processing at a start-up of a system of the vehicle 1B, or at timing at which a change in the environment is expected. The processor 12 may acquire the measured value from the environment sensor 3s (step S51), and select one of the first resonance maps M1 and one of the second resonance maps M2 that correspond to the measured value (step S52).

The processor 12 may carry out the torque command value calculation processing of the third embodiment, with the use of the selected one of the first resonance maps M1 and the selected one of the second resonance maps M2.

In the vehicle control apparatus 10 to be mounted on the vehicles 1 and 1A described in the first and second embodiments, it suffices that the storage 11 holds the plurality of the first resonance maps M1 that corresponds to respective ones of the environmental conditions. The vehicles 1 and 1A described in the first and second embodiments mean a vehicle devoid of the second driving source 5, or a vehicle devoid of the resonance points in the operating regions of the second driving source 5. In this case, it suffices that the processor 12 selects one of the first resonance maps M1 that corresponds to one of the environmental conditions, to calculate the first torque command value with the use of the selected one of the first resonance maps M1.

As described, according to the vehicle control apparatus 10 of the fourth embodiment, in a case with a change in the resonance points depending on the environmental conditions, it is possible to suppress, in response to the change, the generation of the noise sound accompanying the electrical resonance occurring in the first driving source 4, the inverter 6, and their vicinities. Similarly, it is possible to suppress the generation of the noise sound accompanying the electrical resonance occurring in the second driving source 5, the inverter 8A, and their vicinities.

The program of the torque command value calculation processing or the program of the resonance map selection processing described above may be held in a non-transitory computer readable medium such as the ROM of the processor 12. The processor 12 may be configured to read the program held in a portable non-transitory computer readable medium and execute the program. The portable non-transitory computer readable medium as mentioned above may hold the program of the torque command value calculation processing or the program of the resonance map selection processing.

Although some example embodiments of the technology have been described in the forgoing by way of example with reference to the accompanying drawings, the technology is by no means limited to the example embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

According to the aspects of the technology, a first resonance map includes first resonance points. The first resonance points are operating points of a first driving source at which resonance occurs at the occasion of a square wave control of the first driving source. A processor is configured to switch a control method of the first driving source to a sine wave control before an operating point of the first driving source meets the first resonance points. Hence, it is possible to suppress generation of a noise sound caused by electrical resonance in controlling the first driving source.

The processor 12 illustrated in FIGS. 1, 9, 12, and 16 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 12 illustrated in FIGS. 1, 9, 12, and 16. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 12 illustrated in FIGS. 1, 9, 12, and 16.

The invention claimed is:

1. A vehicle control apparatus to be mounted on a vehicle, the vehicle including a first driving source and a first wheel to which torque is to be outputted from the first driving source, the first driving source including an electric motor, the vehicle control apparatus comprising:
a storage configured to hold a first resonance map; and
a processor configured to calculate a first torque command value and switch a control method of the first driving source, the first torque command value indicating a value of the torque to be outputted by the first driving source, wherein
the first resonance map includes, as one or more first resonance points, one or more operating points at which resonance occurs in an operating region of the first driving source under a square wave control, and
the processor is configured to switch the control method of the first driving source from the square wave control to a sine wave control on a condition that a predicted route of transition of an operating point of the first driving source meets the one or more first resonance points.

2. The vehicle control apparatus according to claim 1, wherein
in switching the control method of the first driving source from the square wave control to the sine wave control, the processor is configured to decrease the first torque command value on a condition that the torque of the first driving source is greater than upper limit torque under the sine wave control.

3. The vehicle control apparatus according to claim 2, wherein
the vehicle further includes a second driving source and a second wheel different from the first wheel, the second driving source being configured to output torque to the first wheel or the second wheel,
the processor is configured to calculate a second torque command value that indicates a value of the torque to be outputted by the second driving source, and
in switching the control method of the first driving source to the sine wave control and decreasing the first torque command value, the control processor is configured to increase the second torque command value.

4. The vehicle control apparatus according to claim 3, wherein
the second driving source includes an electric motor,
the storage is configured to hold a second resonance map that includes, as one or more second resonance points, one or more operating points at which resonance occurs in an operating region of the second driving source under the square wave control,
components of the first resonance map include a rotation speed of the first driving source and the torque of the first driving source,
components of the second resonance map include a rotation speed of the second driving source and the torque of the second driving source,
the rotation speed of the first driving source takes a value obtained by multiplying the rotation speed of the second driving source by a first ratio, and
a range of the rotation speed of the first driving source in the first resonance map in which the one or more first resonance points are located is devoid of an overlap with a range obtained by multiplying, by the first ratio, a range of the rotation speed of the second driving source in the second resonance map in which the one or more second resonance points are located.

5. The vehicle control apparatus according to claim 1, wherein
the first resonance map comprises a plurality of first resonance maps that corresponds to respective ones of environmental conditions,
the storage is configured to hold the first resonance maps, and
the processor is configured to use one of the first resonance maps that corresponds to one of the environmental conditions.

6. The vehicle control apparatus according to claim 2, wherein the first resonance map comprises a plurality of first resonance maps that corresponds to respective ones of environmental conditions, the storage is configured to hold the first resonance maps, and the processor is configured to use one of the first resonance maps that corresponds to one of the environmental conditions.

7. The vehicle control apparatus according to claim 3, wherein the first resonance map comprises a plurality of first resonance maps that corresponds to respective ones of environmental conditions, the storage is configured to hold the first resonance maps, and the processor is configured to use one of the first resonance maps that corresponds to one of the environmental conditions.

8. The vehicle control apparatus according to claim 4, wherein the first resonance map comprises a plurality of first resonance maps that corresponds to respective ones of environmental conditions, the storage is configured to hold the first resonance maps, and the processor is configured to use one of the first resonance maps that corresponds to one of the environmental conditions.

* * * * *